US007415526B2

(12) United States Patent
Hirayama

(10) Patent No.: US 7,415,526 B2
(45) Date of Patent: Aug. 19, 2008

(54) DATA-PROVIDING SYSTEM, TRANSMISSION SERVER, DATA TERMINAL APPARATUS AND DATA-PROVIDING METHOD

(75) Inventor: Tomoshi Hirayama, Toyko (JP)

(73) Assignee: Sony Corporation, Tokyo (JP)

( * ) Notice: Subject to any disclaimer, the term of this patent is extended or adjusted under 35 U.S.C. 154(b) by 866 days.

(21) Appl. No.: 09/774,620

(22) Filed: Feb. 1, 2001

(65) Prior Publication Data

US 2001/0042128 A1  Nov. 15, 2001

(30) Foreign Application Priority Data

Feb. 3, 2000  (JP)  ............................. 2000-032700

(51) Int. Cl.
 *G06F 15/16* (2006.01)
 *H04N 7/173* (2006.01)
(52) U.S. Cl. ........................................ 709/231; 725/91
(58) Field of Classification Search ................ 709/231, 709/223; 705/51, 52; 725/86, 91
See application file for complete search history.

(56) References Cited

U.S. PATENT DOCUMENTS

| 5,855,008 | A |   | 12/1998 | Goldhaber et al. |
| 5,924,090 | A |   | 7/1999 | Krellenstein |
| 5,973,683 | A |   | 10/1999 | Cragun et al. |
| 6,002,687 | A | * | 12/1999 | Magee et al. ................ 370/394 |
| 6,006,265 | A | * | 12/1999 | Rangan et al. ............... 709/226 |
| 6,064,796 | A | * | 5/2000 | Nakamura et al. ........... 386/131 |
| 6,181,364 | B1 | * | 1/2001 | Ford .............................. 725/32 |
| 6,219,704 | B1 | * | 4/2001 | Kim et al. .................... 709/224 |
| 6,314,409 | B2 | * | 11/2001 | Schneck et al. ............... 705/54 |
| 6,452,609 | B1 | * | 9/2002 | Katinsky et al. ............. 715/716 |
| 6,490,627 | B1 | * | 12/2002 | Kalra et al. .................. 709/231 |

(Continued)

FOREIGN PATENT DOCUMENTS

EP         0 834 798 A2    4/1998

(Continued)

OTHER PUBLICATIONS

Birch et al. "Closing the loop-payment on demand for interactive services", Broadcasting Convention, 1995. IBC 95., International, Sep. 14-18, 1995, pp. 395-400.*

(Continued)

*Primary Examiner*—Douglas B Blair
(74) *Attorney, Agent, or Firm*—Oblon, Spivak, McClelland, Maier & Neustadt, P.C.

(57) ABSTRACT

A data-providing system comprising a transmission/reproduction control (control 2) section 100A and a program-organizing control (control 3) section 100B. The transmission/reproduction control (control 2) section 100A transmits a continuous stream of content data that is a combination of the multimedia contents (program data 1), auxiliary data items (data 2) and additional auxiliary data items (data 3). The section 100B automatically organizes a new program by processing the attributes (data 4) of program data items generated by dividing a program, the attributes (data 5), each paired with auxiliary data item, the attributes (data 6), each paired with one additional auxiliary data item, and the profile of an user apparatus 10C. The transmission/reproduction control (control 2) section 100A changes the order in which the auxiliary data items to be inserted in the program data will be transmitted, in accordance with the new program organized by the program-organizing control (control 3) section 100B.

8 Claims, 24 Drawing Sheets

U.S. PATENT DOCUMENTS

| | | | |
|---|---|---|---|
| 6,493,763 B1 * | 12/2002 | Suzuki | 709/231 |
| 6,535,919 B1 * | 3/2003 | Inoue et al. | 709/229 |
| 6,564,380 B1 * | 5/2003 | Murphy | 725/86 |
| 6,567,980 B1 * | 5/2003 | Jain et al. | 725/61 |
| 6,658,568 B1 * | 12/2003 | Ginter et al. | 713/193 |
| 6,718,551 B1 * | 4/2004 | Swix et al. | 725/32 |
| 6,876,974 B1 * | 4/2005 | Marsh et al. | 705/14 |
| 6,961,754 B2 * | 11/2005 | Christopoulos et al. | 709/204 |
| 6,978,310 B1 * | 12/2005 | Rodriguez et al. | 709/231 |
| 7,010,492 B1 * | 3/2006 | Bassett et al. | 705/1 |
| 7,233,948 B1 * | 6/2007 | Shamoon et al. | 707/9 |
| 7,315,826 B1 * | 1/2008 | Guheen et al. | 705/7 |
| 7,343,614 B1 * | 3/2008 | Hendricks et al. | 725/8 |
| 2001/0042128 A1 | 11/2001 | Hirayama | |

FOREIGN PATENT DOCUMENTS

| | | |
|---|---|---|
| WO | WO 95/16971 | 6/1995 |
| WO | WO 99/30493 | 6/1999 |

OTHER PUBLICATIONS

Paris et al., "Combining pay-per-view and video-on-demand services", Modeling, Analysis and Simulation of Computer and Telecommunication Systems, 1999. Proceedinggs. 7th International Symposium on, Oct. 24-28, 1999, pp. 270-276.*

U.S. Appl. No. 11/075,911, filed Mar. 10, 2005, Hirayama.

* cited by examiner

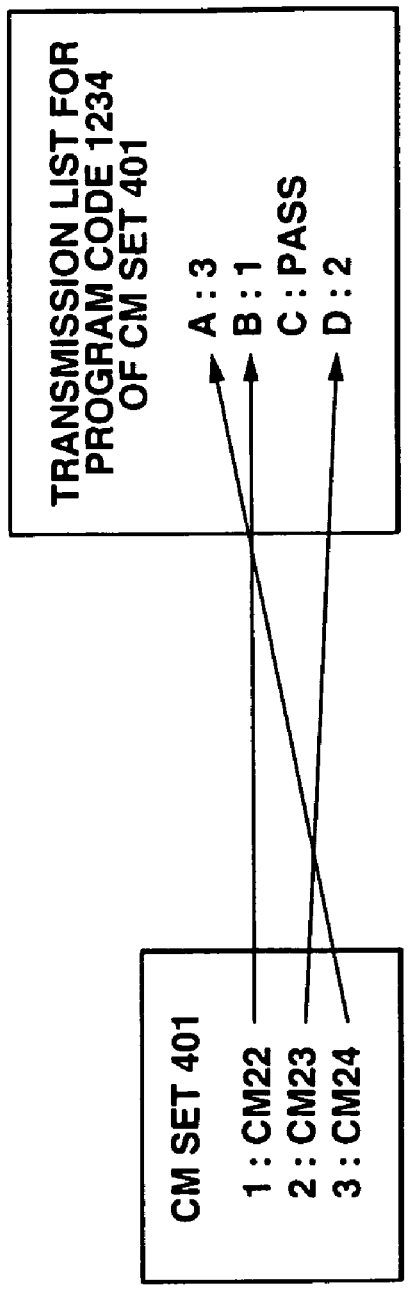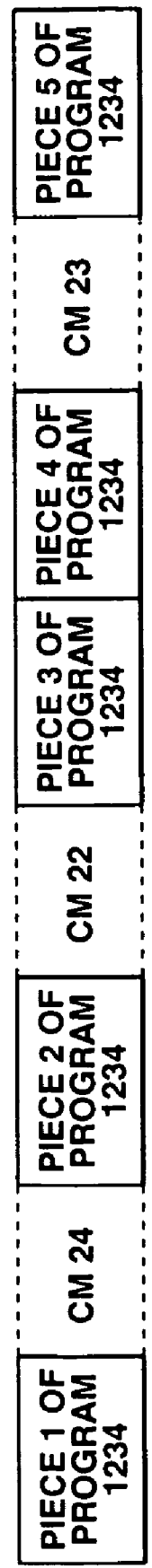
FIG.20A  FIG.20B  FIG.20C

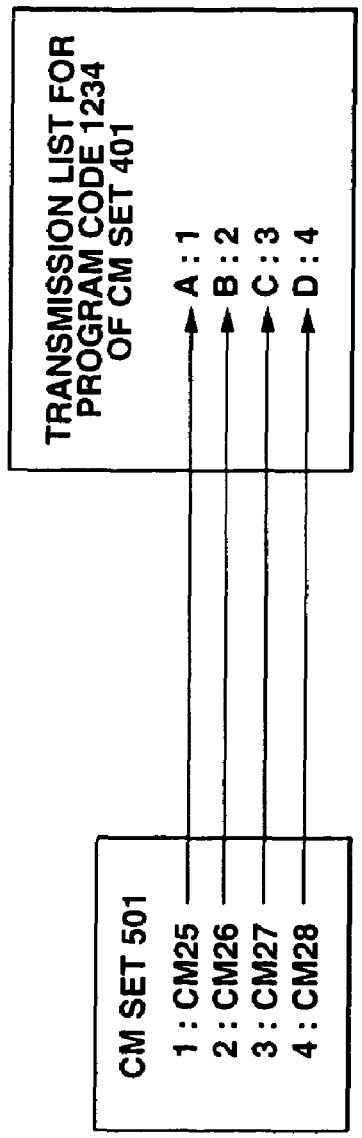
FIG.21A
FIG.21B
FIG.21C

| PIECE 1 OF PROGRAM 1234 | PIECE 2 OF PROGRAM 1234 | PIECE 3 OF PROGRAM 1234 | PIECE 4 OF PROGRAM 1234 | PIECE 5 OF PROGRAM 1234 |
|---|---|---|---|---|

FIG.22

PROGRAM CODE TO BE INSERTED
FOR CM SET 445
PROGRAM CODE 1234,
PROGRAM CODE 4456,
PROGRAM CODE 5377

FIG.23

DATA-PROVIDING SYSTEM, TRANSMISSION SERVER, DATA TERMINAL APPARATUS AND DATA-PROVIDING METHOD

BACKGROUND OF THE INVENTION

The present invention relates to a data-providing system, a transmission server, a data terminal apparatus and a data-providing method, each designed to achieve streaming transmission of multimedia contents, such as dynamic-picture data, still-picture data, audio data, computer data and the like, through Internet, a cable television network, a personal-computer communication network, a large-scale LAN or a data communication network such as radio communication network or a cable broadcasting network. In particular, the invention relates to a data-providing system, a transmission server, a data terminal apparatus and a data-providing method, each designed to change the order (or rearrange) the auxiliary data items incorporated in program data, to add new auxiliary data items to the program data from external systems and to replace some of the auxiliary data items with the new auxiliary data items. The data-providing system incorporates a fee-charging function and a charge-settling function.

In a data communication network such as Internet, streaming transmission of data is performed, enabling users to select and obtain at their terminals any on-demand programs they want.

The on-demand programs are stored in the transmission center that transmits or broadcasts the on-demand programs. Among the programs the transmission center stores are:

1) Year-end movies and new-year movies, each containing commercials for Christmas sales 2) New-year movies, each containing commercials for new-year sales 3) Year-end movies and new-year movies to be broadcast in night hours, each containing commercials.

Upon receipt of a demand from any user, the transmission center selects and transmits the program (e.g., a movie of any of the categories 1 to 3 described above) the user wants to enjoy. Different prices are set to the on-demand programs and costs are distributed to them.

In the existing on-demand broadcasting, the user can selects a plurality of programs at a time but cannot select one of the versions, if available, of the same program.

As the Internet technology advances, various contents prepared to meet the users' tastes are distributed in increasing numbers. People now wish to obtain data customized to their tastes, rather than the information presented by mass media. If data customized to the different tastes of the users is prepared, it will be an extremely amount of data. To store a large amount of data, the transmission center needs to have a large storage capacity. In addition, it takes much time and labor to edit programs to adapt them to the users' tastes that keep changing.

In the on-demand broadcasting practiced hitherto, one price is set to a combination of programs and a cost is distributed thereto. If the combination of programs is changed immediately before the programs are transmitted, it becomes difficult to determine what should be the price of the new combination and how the cost should be distributed thereto. Further, the storage capacity the transmission center must have for the library of programs grows considerably large. The transmission center needs to have an extremely large storage capacity, particularly if there is prepared a plurality of various parts that are to be inserted into programs. In this case, price-setting and cost-distribution are required for each of these program parts.

BRIEF SUMMARY OF THE INVENTION

Accordingly, an object of this invention is to change the order in which auxiliary data items, if any, which are combined with program data and which will be transmitted in a specific order.

Another object of the invention is to prohibit the transmission of auxiliary data items, if any, which are combined with program data and which will be transmitted in a specific order. (That is, a skip instruction can be generated.)

Still another object of this invention is to transmit auxiliary data items (addition auxiliary data items), other than auxiliary data items for replacing the auxiliary data items not to be transmitted, even if there are other auxiliary data items which are combined with program data and which will be transmitted in a specific order.

A data-providing system according to the present invention comprises: a first data-transmitting section for transmitting a continuous stream of content data that consists of multimedia content groups, each composed of program data and auxiliary data items; an edit control section for performing an operation on the attributes of each program data and auxiliary data items, thereby automatically assembling new data; and a second data-transmitting section for selecting the auxiliary data items to be inserted into the program data in accordance with the new data assembled by the edit control section, thereby to transmit a continuous stream of content data that consists of multimedia content groups, each composed of the program data and the auxiliary data items.

A data-providing system according to the invention comprises: a first data-transmitting section for transmitting a continuous stream of content data that consists of multimedia content groups, each composed of program data and auxiliary data items; an edit control section for performing an operation on the attributes of each program data and auxiliary data items and the profile data of a user apparatus, thereby automatically assembling new data; and a second data-transmitting section for selecting the auxiliary data items to be inserted into the program data in accordance with the new data assembled by the edit control section, thereby to transmit a continuous stream of content data that consists of multimedia content groups, each composed of the program data and the auxiliary data items.

A data server apparatus according to this invention comprises: a first data-transmitting section for transmitting a continuous stream of content data that consists of multimedia content groups, each composed of program data and auxiliary data items; an edit control section for performing an operation on the profile data items of the attributes of each program data and auxiliary data items, thereby automatically assembling new data; and a second data-transmitting section for selecting the auxiliary data items to be inserted into the program data in accordance with the new data assembled by the edit control section, thereby to transmit a continuous stream of content data that consists of multimedia content groups, each composed of the program data and the auxiliary data items.

A data server apparatus according to the invention comprises: a first data-transmitting section for transmitting a continuous stream of content data that consists of multimedia content groups, each composed of program data and auxiliary data items; an edit control section for performing an operation on the profile data items of the attributes of each program data and auxiliary data items and the profile data of a user apparatus, thereby automatically assembling new data; and a second data-transmitting section for selecting the auxiliary data items to be inserted into the program data in accordance with the new data assembled by the edit control section, thereby to transmit a continuous stream of content data that consists of multimedia content groups, each composed of the program data and the auxiliary data items.

A data terminal apparatus according to this invention comprises: a first data-transmitting section for receiving a continuous stream of content data that consists of multimedia content groups, each composed of program data and auxiliary data items; an edit control section for performing an operation on the attributes of each program data and auxiliary data items, thereby automatically assembling new data; and a second data-transmitting section for selecting the auxiliary data items to be inserted into the program data in accordance with the new data assembled by the edit control section, thereby to transmit a continuous stream of content data that consists of multimedia content groups, each composed of the program data and the auxiliary data items.

A data terminal apparatus according to the invention comprises: a first data-transmitting section for receiving a continuous stream of content data that consists of multimedia content groups, each composed of program data and auxiliary data items; an edit control section for performing an operation on the attributes of each program data and auxiliary data items and the profile data of a user apparatus, thereby automatically assembling new data; and a second data-transmitting section for selecting the auxiliary data items to be inserted into the program data in accordance with the new data assembled by the edit control section, thereby to transmit a continuous stream of content data that consists of multimedia content groups, each composed of the program data and the auxiliary data items.

A method of providing data, according to the present invention, comprises the steps of: transmitting a continuous stream of content data that consists of multimedia content groups, each composed of program data and auxiliary data items; performing an operation on the attributes of each program data and auxiliary data items, thereby automatically assembling new content data; and selecting the auxiliary data items to be inserted into the program data in accordance with the new content data, thereby to transmit a continuous stream of content data that consists of multimedia content groups, each composed of the program data and the auxiliary data items.

A method of providing data, comprising the steps of:

transmitting a continuous stream of content data that consists of multimedia content groups, each composed of program data and auxiliary data items;

performing an operation on the attributes of each program data and auxiliary data items and the profile data of a user apparatus, thereby automatically assembling new content data; and selecting the auxiliary data items to be inserted into the program data in accordance with the new content data, thereby to transmit a continuous stream of content data that consists of multimedia content groups, each composed of the program data and the auxiliary data items.

In the present invention, a continuous stream of content data is transmitted. The content data consists of multimedia content groups, each composed of program data and auxiliary data items. An operation is performed on the attributes of each program data and auxiliary data items and the profile data of a user apparatus, thereby automatically assembling new content data. The auxiliary data items to be inserted into the program data in accordance with the new content data are selected, thereby transmitting a continuous stream of content data that consists of multimedia content groups, each composed of the program data and the auxiliary data items. Therefore, the order in which the auxiliary data items can be changed even if the auxiliary data items are arranged in a prescribed order in the program data. Further, it is possible to skip a certain auxiliary data item contained in the content data, even if the auxiliary data items are arranged in a prescribed order in the program data. Moreover, an additional auxiliary data item, not an auxiliary data item, may be transmitted in place of any auxiliary data item that is skipped, even if the auxiliary data items are arranged in a prescribed order in the program data.

BRIEF DESCRIPTION OF THE SEVERAL VIEWS OF THE DRAWING

FIG. 20 is a diagram illustrating a method of preparing a CM set and a CM-transmission list;

FIG. 21 is a diagram showing another method of preparing a CM set and a CM-transmission list;

FIG. 22 is a diagram depicting the data to transmit, in which no CM sets are inserted;

FIG. 23 is a diagram showing the codes of programs into which CM sets are to be inserted in the data-providing system;

DETAILED DESCRIPTION OF THE INVENTION

An embodiment of the present invention will be described, with reference to the accompanying drawings.

Figure 1:
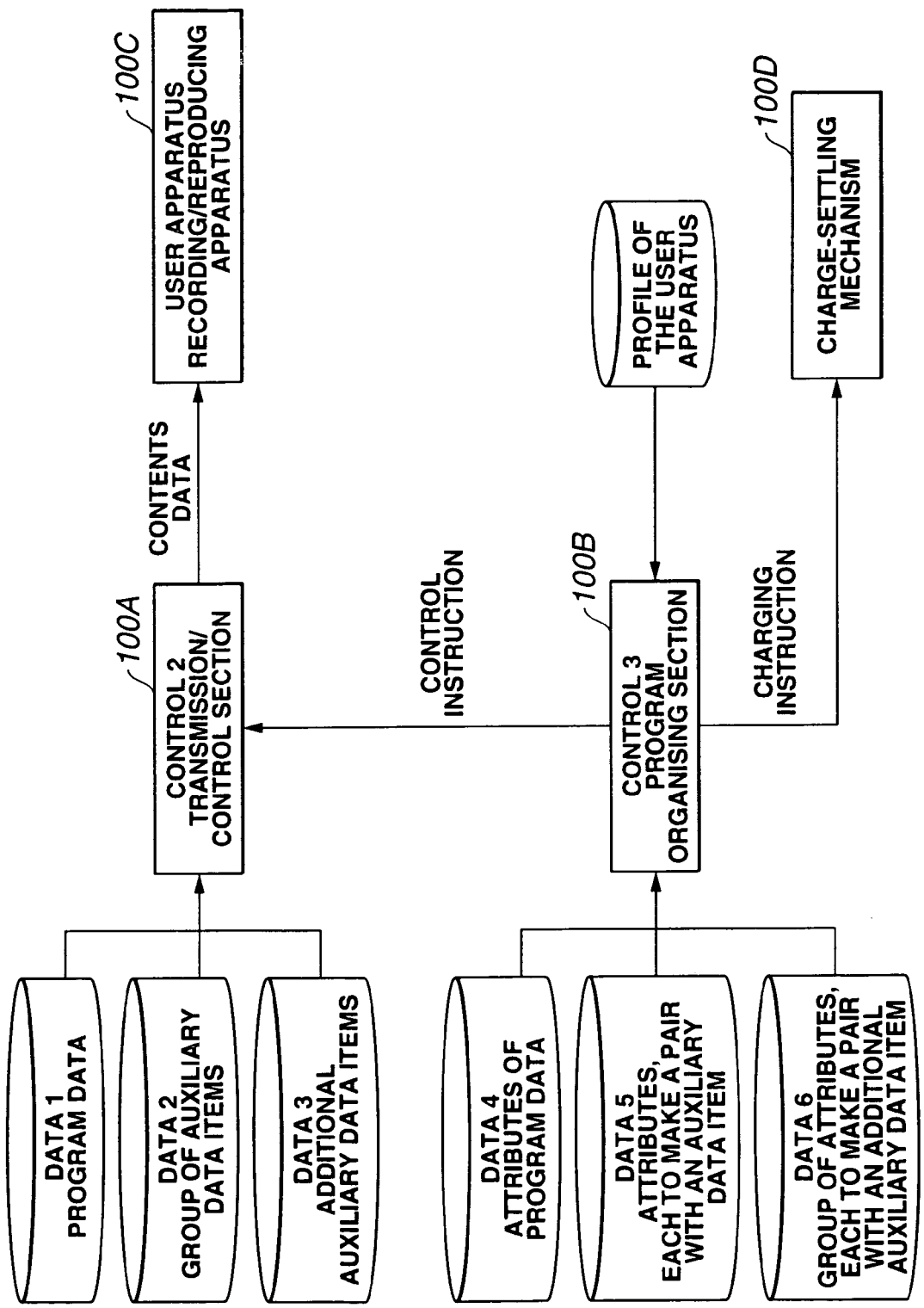
FIG. 1 is a block diagram showing the basic structure of a data-providing system according to the present invention.

FIG. 1 illustrates the basic structure of the data-providing system. As shown in FIG. 1, the system 100 has a transmission/reproduction control (control 2) section 100A and a program-organizing control (control 3) section 100B. The transmission/reproduction control (control 2) section 100A transmits a continuous stream of content data that is a combination of the multimedia contents (i.e., program data, or data 1), auxiliary data items (data 2) and additional auxiliary data items (data 3). The program-organizing control (control 3) section 100B automatically organizes a new program by processing the attributes (data 4) of program data items generated by dividing a program, the attributes (data 5), each paired with auxiliary data item, the attributes (data 6), each paired with one additional auxiliary data item, and the profile of an user apparatus 100C. The transmission/reproduction control (control 2) section 100A changes the order in which the auxiliary data items to be inserted in the program data will be transmitted, in accordance with the new program organized by the program-organizing control (control 3) section 100B.

Data items 1 to 6 may be all transmitted to a terminal (i.e., a data recording/reproducing apparatus), or only "necessary" data items may be transmitted to the terminal. Alternatively, data items 1 to 6 may be processed while being held in a server. Moreover, necessary data (i.e., content clip=program data+auxiliary data items) may be transmitted to a terminal in the form of a package medium, compressed data, consecutive data streams, or a transmission multi-cast. In addition, a necessary additional content clip may be transmitted, as data recorded in a package medium, or by means of streaming transmission. The control sections 2 and 3 may be implemented in a terminal or a server. Furthermore, the profile of the user apparatus can be located in a terminal or a server, whichever desired.

More specifically, the data-providing system can provide data in 32 patterns that are shown in the following Tables 1 to 8:

TABLE 1

|  | 1 | 2 | 3 | 4 |
|---|---|---|---|---|
| Attributes of program | Terminal | Terminal | Terminal | Terminal |
| Attributes of auxiliary data items | Terminal | Terminal | Terminal | Terminal |
| Attributes of additional auxiliary data items | Terminal | Terminal | Terminal | Terminal |
| Profile | Terminal | Terminal | Server | Server |
| Operations | Terminal | Server | Terminal | Server |

TABLE 2

|  | 5 | 6 | 7 | 8 |
|---|---|---|---|---|
| Attributes of program | Server | Server | Server | Server |
| Attributes of auxiliary data items | Server | Server | Server | Server |
| Attributes of additional auxiliary data items | Server | Server | Server | Server |
| Profile | Terminal | Terminal | Server | Server |
| Operations | Terminal | Server | Terminal | Server |

TABLE 3

|  | 9 | 10 | 11 | 12 |
|---|---|---|---|---|
| Attributes of program | Server | Server | Server | Server |
| Attributes of auxiliary data items | Terminal | Terminal | Terminal | Terminal |
| Attributes of additional auxiliary data items | Terminal | Terminal | Terminal | Terminal |
| Profile | Terminal | Terminal | Server | Server |
| Operations | Terminal | Server | Terminal | Server |

TABLE 4

|  | 13 | 14 | 15 | 16 |
|---|---|---|---|---|
| Attributes of program | Terminal | Terminal | Terminal | Terminal |
| Attributes of auxiliary data items | Server | Server | Server | Server |
| Attributes of additional auxiliary data items | Server | Server | Server | Server |
| Profile | Terminal | Terminal | Server | Server |
| Operations | Terminal | Server | Terminal | Server |

TABLE 5

|  | 17 | 18 | 19 | 20 |
|---|---|---|---|---|
| Attributes of program | Server | Server | Server | Server |
| Attributes of auxiliary data items | Terminal | Terminal | Terminal | Terminal |
| Attributes of additional auxiliary data items | Server | Server | Server | Server |
| Profile | Terminal | Terminal | Server | Server |
| Operations | Terminal | Server | Terminal | Server |

TABLE 6

|  | 21 | 22 | 23 | 24 |
|---|---|---|---|---|
| Attributes of program | Terminal | Terminal | Terminal | Terminal |
| Attributes of auxiliary data items | Server | Server | Server | Server |
| Attributes of additional auxiliary data items | Terminal | Terminal | Terminal | Terminal |
| Profile | Terminal | Terminal | Server | Server |
| Operations | Terminal | Server | Terminal | Server |

TABLE 7

|  | 25 | 26 | 27 | 28 |
|---|---|---|---|---|
| Attributes of program | Server | Server | Server | Server |
| Attributes of auxiliary data items | Server | Server | Server | Server |
| Attributes of additional auxiliary data items | Terminal | Terminal | Terminal | Terminal |

TABLE 7-continued

|  | 25 | 26 | 27 | 28 |
|---|---|---|---|---|
| Profile | Terminal | Terminal | Server | Server |
| Operations | Terminal | Server | Terminal | Server |

TABLE 8

|  | 28 | 29 | 30 | 31 |
|---|---|---|---|---|
| Attributes of program | Terminal | Terminal | Terminal | Terminal |
| Attributes of auxiliary data items | Terminal | Terminal | Terminal | Terminal |
| Attributes of additional auxiliary data items | Server | Server | Server | Server |
| Profile | Terminal | Terminal | Server | Server |
| Operations | Terminal | Server | Terminal | Server |

Of the 32 combination patterns shown above, the patterns 1 and pattern 8 are notable in that all attribute data items are stored in either the terminal or server. Thus, in the patterns 1 and 8, the attribute data items need not be transferred. In the patterns 9 to 24, the attribute data items are distributed to the terminal and the server and must be transferred to either the terminal or server so that they may be subjected to operations. Nonetheless, the patterns 9 to 24, wherein the attribute data items are so distributed, are advantageous because the terminal need not have a large storage capacity if the service the system provides does not require frequent transfer of auxiliary data items.

Figure 2:
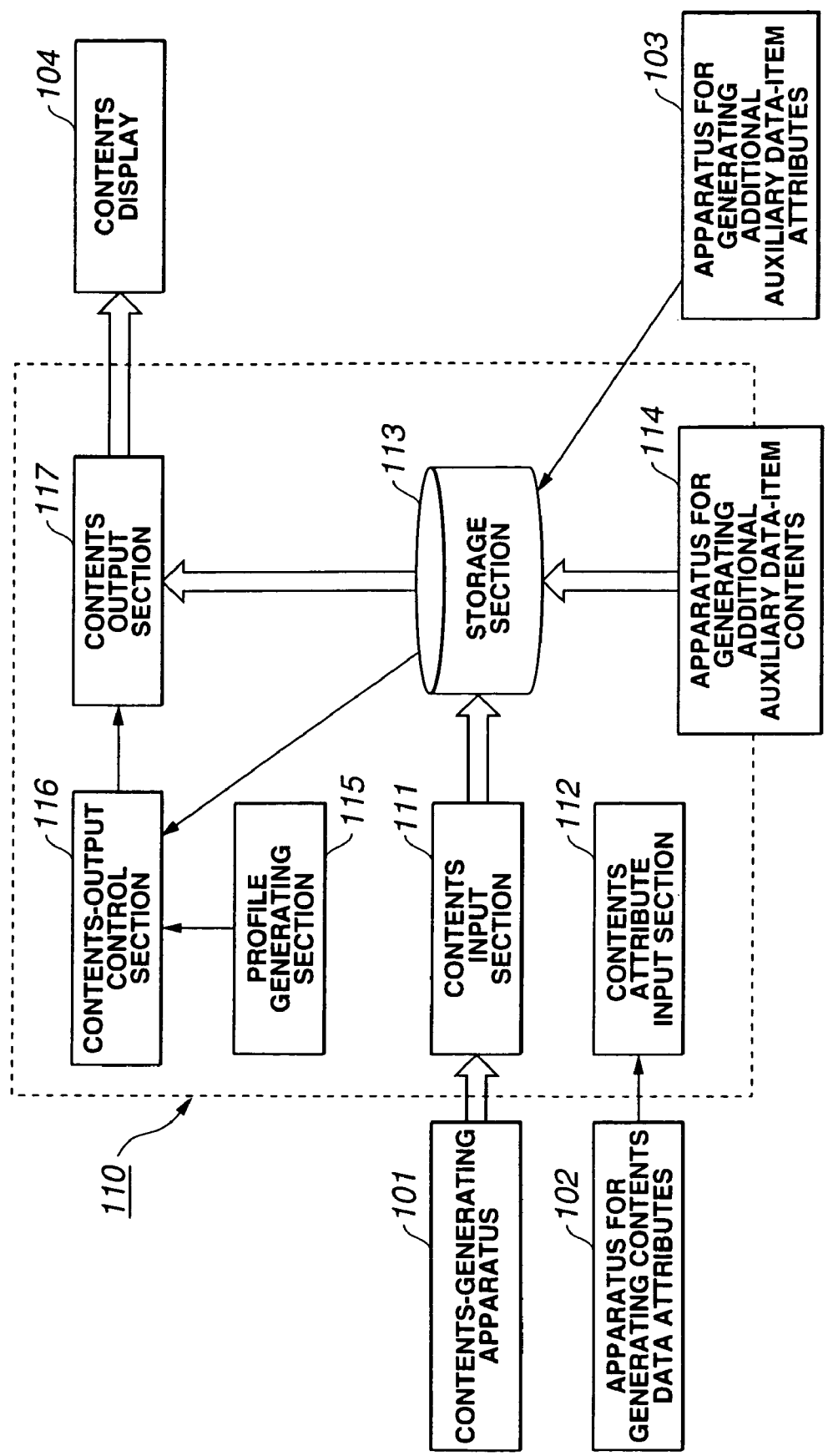
FIG. 2 is a block diagram depicting a data terminal apparatus incorporated in the data-providing system.

A data terminal apparatus 110 that works in the pattern 1 described above has the structure shown in FIG. 2.

In the data terminal apparatus 110, the contents generating apparatus 101 generates program data and auxiliary data items. The program data and the auxiliary data items constitute multimedia contents. The multimedia contents are supplied through the contents input section 111 to the storage section 113. The apparatus 102 generates attributes, each to make a pair with a program data item and an auxiliary data item. The attributes are supplied from the apparatus 102 via the contents attribute input section 112 to the storage section 113. Further, the apparatus 114 generates additional auxiliary contents, and the apparatus 103 generates the attributes of additional auxiliary data items. The additional auxiliary contents and the attributes of additional auxiliary data items are supplied from the apparatuses 114 and 103 to the storage section 113.

In the data terminal apparatus 110, the profile generating section 115 generates profile data, which is supplied to the contents-output control section 116. The attributes read from the storage section 113 are supplied to the contents-output control section 116, too. The section 116 compares the profile data with the attributes and processes them, thereby organizing new data. The section 116 selects auxiliary data items to be inserted into the program data, in accordance with the new data. The auxiliary data items thus selected are combined with the program data, forming multimedia contents. The multimedia contents, or content data, are supplied from the content output section 117 to the content display 104.

A data server apparatus 120 that works in the pattern 8 described above has the structure shown in FIG. 3.

Figure 3:
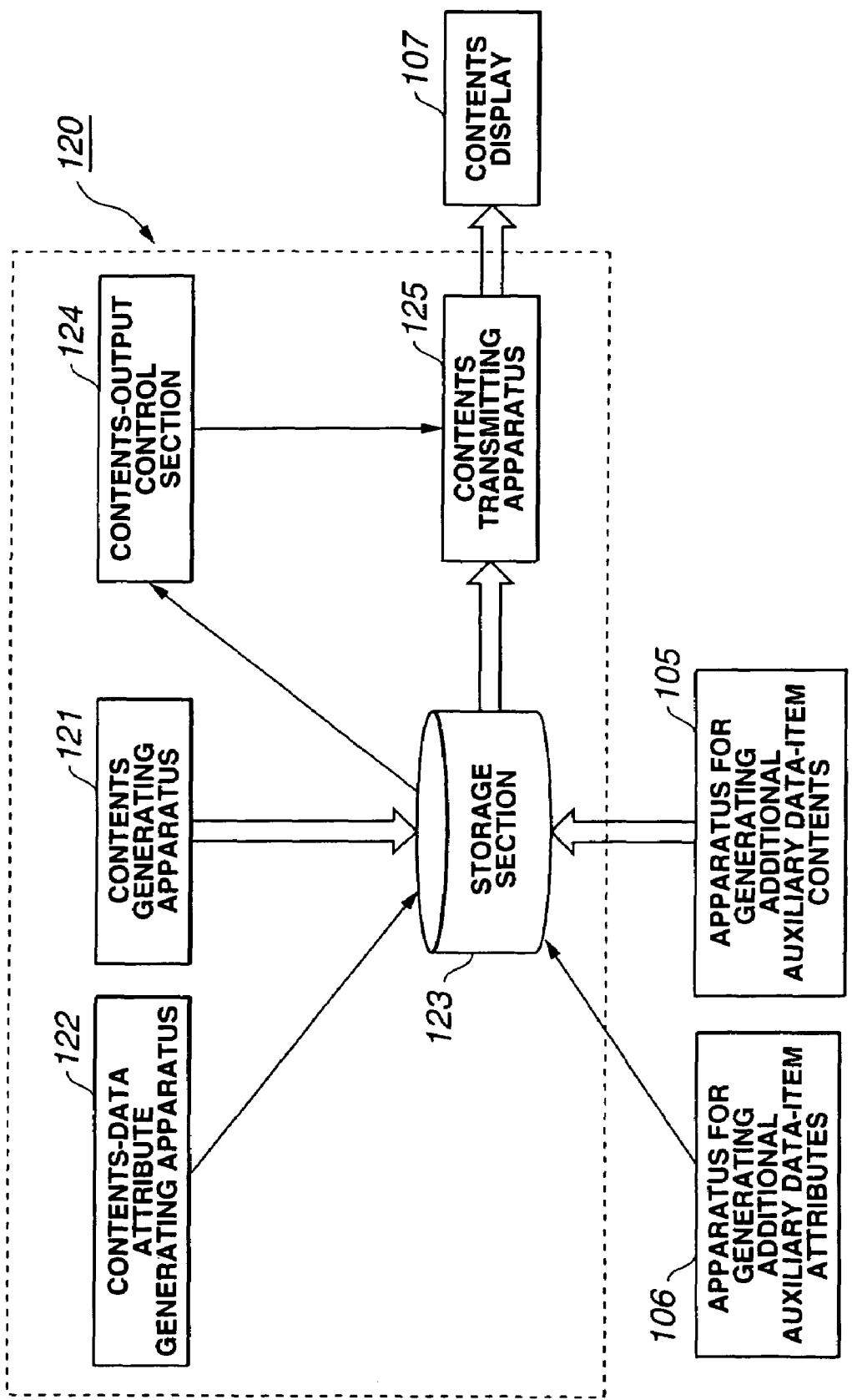
FIG. 3 is a block diagram another type of a data terminal apparatus that may be incorporated in the data-providing system.

As FIG. 3 shows, the data server apparatus 120 comprises a contents generating apparatus 121, a contents-data attribute generating apparatus 122, a storage section 123, a contents output control section 124, and a contents transmitting apparatus 125. In the data server apparatus 120, the contents generating apparatus 121 generates content data, i.e., multimedia data items that are combination of program data and auxiliary data items. The contents-data attribute generating apparatus 122 generates attributes, each to make a pair with one auxiliary data item. The storage section 123 stores the content data generated by the apparatus 121 and the attributes generated by the section 122. An apparatus 105 for generating additional auxiliary data-item contents, an apparatus 106 for generating the attributes of additional data-item contents, and a contents display 107 are connected to the data server apparatus 120. The apparatus 105 generates additional auxiliary data-item contents. The apparatus 106 generates the attributes of the additional data-item contents. The storage section 123 stores the additional auxiliary data-item contents generated by the section 105 and the attributes of additional auxiliary data-item contents, generated by the section 106.

In the data server apparatus 120, the attributes are read from the storage section 123, and profile data is read from the storage section 123. The attributes and the profile data are supplied to the contents output control section 124. The section 124 compares the attributes and the profile data and processes them, automatically organizing new data. In accordance with the new data the section 124 selects the auxiliary data items inserted in the program data, thus generating content data that is a combination of the program data and the auxiliary data items. The content data, thus generated, is supplied to the content display 107 from the contents transmitting apparatus 125.

Figure 4:
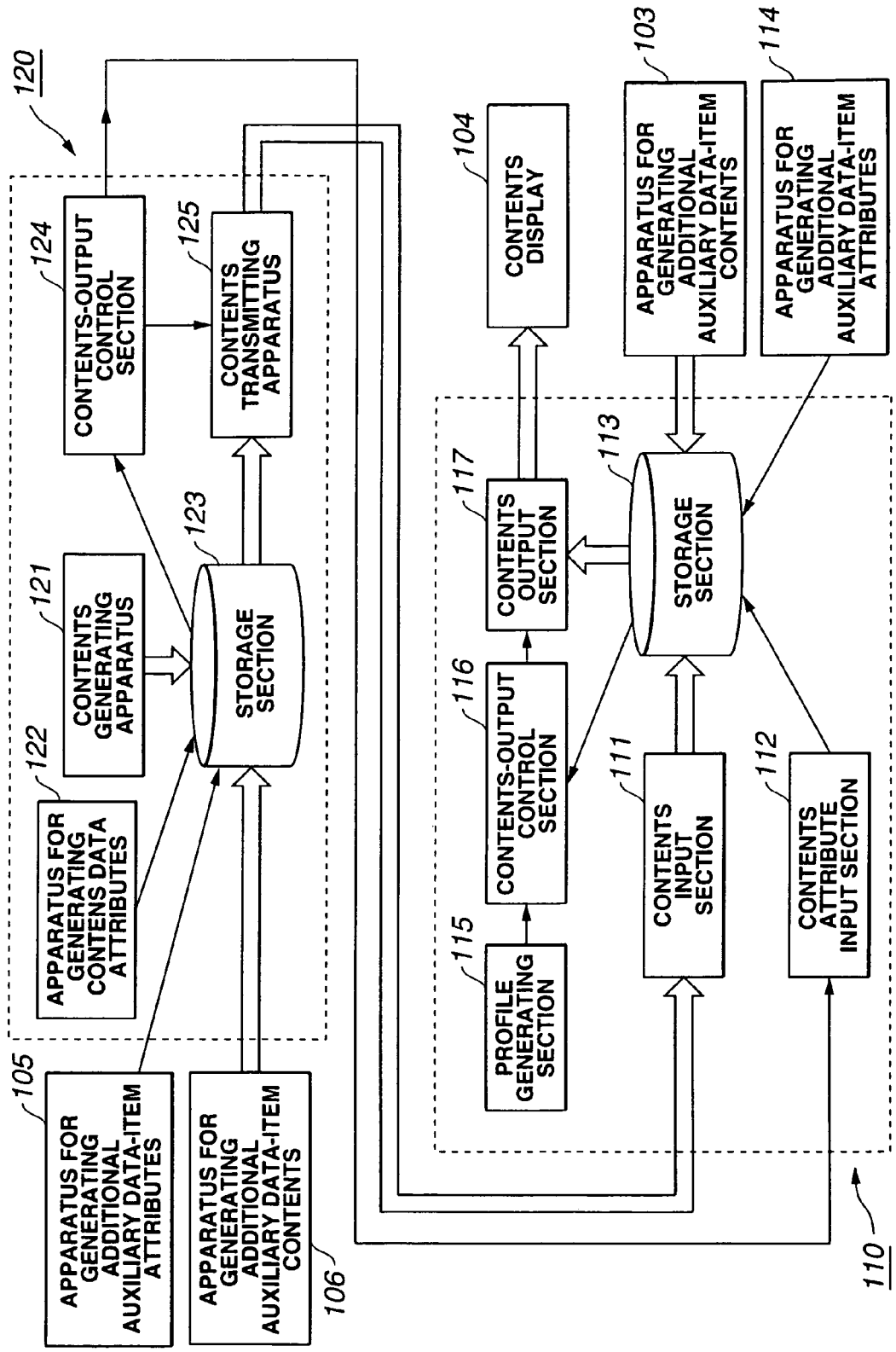
FIG. 4 is a diagram explaining how on-demand transmission is effected and how a data item is replaced by another in a transmitting station.

FIG. 4 shows a data-providing system, in which a broadcast network and a communication network connect a data terminal apparatus 110 and a data server apparatus 120. It will be described how on-demand communication is achieved, how data items are replaced in a transmitting station, and how data items are replaced in a data terminal apparatus, in the data-providing system illustrated in FIG. 4.

Assume that data server apparatus 120 incorporated in the transmitting station stores a part of the profile of each user.

Also assume that a user has designated a program and that data, including the auxiliary data items contained in the program designated, is about to be transmitted to that user.

Let us assume that the language designated in the profile stored in the server apparatus 120 is "French," and that one of the auxiliary data items (auxiliary data item D) is "German." Then, the profile and the attribute of the auxiliary data item are subjected to an operation, thereby replacing the auxiliary data item D, or "German," with another auxiliary data item Further assume that the auxiliary data item F that will replace the auxiliary data item D is "French," and that all other conditions (replacement conditions and the like) have been cleared. Then, the auxiliary data item D is replaced by the auxiliary data item F, which will be transmitted to the user.

Assume that the program the user has designated is transmitted, starting at 12:10 and ending at 13:10, that the program contains an auxiliary data item T, e.g., an hour announcement, that the data terminal apparatus 110 stores the data showing the hour announcement made, and that the user inputs an instruction for reproducing the program again, at about 18:30.

Also assume that the attribute of the auxiliary data item T describes the data item T is an hour announcement, and can be subjected to an operation, along with the timer data that is a part of the profile data about the recording/reproducing apparatus.

The result of operation indicates that the time of the profile may not coincide with the time predicted for reproducing the attribute of the auxiliary data item T. In this case, the contents output control mechanism replaces the auxiliary data item T with an auxiliary data item T', or "hour announcement." Note that the auxiliary data item T' has been generated (synthesized) in the recording/reproducing apparatus and is controlled by the profile output from an apparatus for generating additional auxiliary data-item contents.

Assume that the auxiliary data item T' is an hour announcement that coincides with the timer data of the profile, and that all other conditions (replacement conditions and the like) have been cleared. Then, the auxiliary data item T is replaced by the auxiliary data item T', which will be reproduced when the program is reproduced.

Auxiliary data items are transmitted via the broadcast network. It will be described how the auxiliary data items are skipped in the recording/reproducing apparatus and how additional auxiliary data items are acquired and down-loaded to replace the auxiliary data items.

Assume the server apparatus 120 provided in the transmitting station transmits the same multimedia contents to all users via the broadcast network. The multimedia contents are a combination of a program data and auxiliary data items.

Further assume that the server apparatus 120 in the transmitting station also stores additional auxiliary data items prepared for use in customization and that the users can down-load the additional auxiliary data items via the Internet.

Suppose the program data represents information about annual income reports that people need to file with the tax office.

The program data contain auxiliary data items that are inserted at appropriate positions. The auxiliary data items may include data item 1 of "If you received annuities," data item 2 of "If you gained real-estate income," data item 3 of "If your annual income surpassed 20 million yen," data item 4 of "If you got profits overseas," and the like.

A user may push the pause button, freezing the information displayed on his terminal screen. Using the GUI of the recording/reproducing apparatus, the user inputs the data representing whether he received annuities, whether gained real-estate income, whether his annual income surpassed 20 million yen, whether he got profits overseas, and similar facts." The data input is added to the profile data stored in the recording/reproducing apparatus.

While the pause button remains pushed, the program data is automatically stored in the content storage section provided in the recording/reproducing apparatus. Thus, when the pause button is released, the program keeps going, neither skipped nor disconnected. (However, the program lags in time, with respect to the real-time broadcast.)

As the program proceeds, displaying the auxiliary data items 1 to 4, an operation is performed on the profile and the attributes of data items 1 to 4. The auxiliary data items 1 and 2 are skipped if they do not agree to the events recorded in the profile.

As for the auxiliary data items 3 and 4, the contents inserted in the program data are nothing but "introduction" (as is so described in the attribute). Therefore, additional auxiliary data items are acquired if necessary.

In this embodiment additional auxiliary data items are obtained on demand through the Internet. Nonetheless, they may be acquired by any other method.

For example, an additional data item may be acquired to replace the auxiliary data item 4 by performing an operation of the attribute of the data item 4 and the profile, if the profile describes "the user got an income of 40,000 dollars in the United States." In this case, the additional auxiliary data item, "the user got an income ranging from 30,000 to 50,000 dollars in the United States," is down-loaded and reproduced in place of the auxiliary data item 4.

In the recording/reproducing apparatus, auxiliary data items negotiate with one another and the order of the auxiliary data items is changed. How the auxiliary data items negotiate and how the order of the data items is changed will be explained below.

Suppose the data server apparatus 120 transmits to all users the same program A that is multimedia contents comprised of a program data and auxiliary data items, through the broadcast network.

Let us assume that additional auxiliary data items prepared for use in customization are contained in the last part of the program data, as an ordinary auxiliary data item (i.e., auxiliary data item 5, described later). In this case, the user who view the program A in real time may feel that the program is somewhat longer, with some auxiliary data items added to the last part of the program A.

Assume that five auxiliary data items 1 to 5 are contained in the program A. The auxiliary data items 1 and 2 may be advertisements of "food A put on sale until Christmas" and "food B," respectively. The auxiliary data item 3 may be an advertisement of "restaurant C campaigning for Christmas." The auxiliary data item 4 may be an advertisement of "restaurant D." The auxiliary data item 5, which is contained in the last part of the program A, may be an advertisement of "restaurant E campaigning for new-year days."

Further assume that the first half of the program A is an introduction of restaurants and the second half thereof is cooking instructions. More precisely, the attribute of the program A describes that the auxiliary data items 1 and 2 introduce restaurants and that the auxiliary data items 3, 4 and 5 gives information about the foods served in the restaurants.

The auxiliary data items 1 and 2 are contained in the first half of the program A. The auxiliary data items 3 and 4 are contained in the second half of the program A. Recall that the auxiliary data item 5 is contained in the last part of the program A.

A user acquires the program A (before Christmas) and records it into the data terminal apparatus 110.

Assume that the attribute of the auxiliary data item 1 describes that the data item can be reproduced until December 25 and that the auxiliary data item 1 can be assigned if the program contains an auxiliary data item complying with the assignment conditions. If the program does not contain such an auxiliary data item, the right to the auxiliary data item 1 will be skipped.

The conditions for assigning the auxiliary data item 1 are as follows:

(1) The auxiliary data item shall be assigned for 5 yen or more if it is no longer valid.

(2) However, no negotiation shall be conducted to assign the auxiliary data item to any financial organizations.

Assume that the attribute of the auxiliary data item 3 describes the data item can be reproduced until December 25 and that the right to the auxiliary data item 1 will be skipped if the auxiliary data item 3 can no longer be reproduced.

Assume that the attribute of the auxiliary data item 5 describes that the data item can be reproduced at any time desired and that the auxiliary data item 5 can be assigned if the program contains an auxiliary data item complying with the assignment conditions. If the program does not contain such an auxiliary data item, nothing will be done to the auxiliary data item 5.

The conditions for assigning the auxiliary data item 5 are as follows:

(1) After assigned with the auxiliary data item, the assignee shall pay 10 yen to shift the auxiliary data item forwards in the time axis.

(2) No negotiation shall be conducted to assign the auxiliary data item in connection with the advertisement of any restaurant.

(3) The negotiation shall be conducted to assign that part of the program which contains advertisement of restaurants.

Let us assume that the user pushes the reproduction button on any day in January.

In this case an operation is effected on the profile and the attribute of auxiliary data item 1. It is thereby detected that the auxiliary data item 1 is no longer valid. Hence, the negotiation is started over the assignment conditions the attribute of auxiliary data item 1 describes.

More specifically, the negotiation is started over the assignment conditions described in the attribute of the auxiliary data item 5, the assignment conditions described in the attribute of the auxiliary data item 1 and the conditions for charging fees and settling the charge in connection with both data items 1 and 5.

In view of the auxiliary data item 1, the auxiliary data item 5 has nothing to do with financial matters. Since the auxiliary data item 1 may be assigned for 5 yen or more, the assignment condition for the auxiliary data item 1 is satisfied.

In view of the auxiliary data item 5, the auxiliary data item 1 is not concerned with an advertisement of restaurants. Since the auxiliary data item 5 may be assigned for 10 yen, the assignment condition for the auxiliary data item 5 is satisfied.

In view of the auxiliary data item 5 and the attribute of program A, the auxiliary data item 1 is not concerned with an advertisement of restaurants.

An operation is carried out on the profile and the attribute of each auxiliary data item, and an operation is performed on the attributes of auxiliary data items. The auxiliary data item 5 is thereby reproduced, replacing the auxiliary data item 1 and assuming a forward position in the program A.

An operation is performed on the profile and the attribute of auxiliary data item 3. It is thereby detected that the auxiliary data item 3 is no longer valid. The auxiliary data item 3 is therefore skipped at the time of reproduction.

Various types of operations (negotiations or matching) may be effectuated on the profile and the attribute of each auxiliary data item. Various possible negotiations may be conducted between the profile and the attribute. Various combinations of the operations, on the one hand, and the negotiations, on the other, are shown in the following Table 9.

Further, various negotiation will be described below.

TABLE 9

| | | | |
|---|---|---|---|
| 1) | Attribute of the program | ←→ Profile | Principal object of the negotiation |
| 2) | Attribute of the auxiliary data item/confirmation of the validation term | ←→ Profile | Personalization/ localization |
| 3) | Attribute of the additional auxiliary data item/ confirmation of the validation term | ←→ Profile | Personalization/ localization |
| 4) | Attribute of the program | ←→ Attribute of the auxiliary data item | Limitation of the assignment or the like |
| 5) | Attribute of the auxiliary data item | ←→ Attribute of the auxiliary data item | Limitation of the assignment or the like |
| 6) | Attribute of the additional auxiliary data item | ←→ Attribute of the auxiliary data item | Limitation of the assignment or the like |
| 7) | Attribute of the program | ←→ Attribute of the additional auxiliary data item | Limitation of the assignment or the like |

TABLE 9-continued

| | | | |
|---|---|---|---|
| 8) | Attribute of the auxiliary data item | ←→ Attribute of the additional auxiliary data item | Limitation of the assignment or the like |
| 9) | Attribute of the additional auxiliary data item | ←→ Attribute of the additional auxiliary data item | Limitation of the assignment or the like |

1. Filtering for Limiting Audience

Various personal data items of a user are recorded in the profile. The personal data items represent the living area, age, sex, income, job, language, hobby and the like. The personal data items include a data item showing whether the other personal data items may be disclosed or not. On the other hand, the program data and the attributes of the auxiliary data items and additional auxiliary data items describe the living area, age, income, job, language, hobby and the like of audience to which the program is dedicated.

One of the operations to be performed on the profile and the attribute is the matching of conditions.

Logic sum (OR) and logic product (AND) of these conditions can be made, and the degree of matching of conditions may be presented in terms of points, thereby providing numerical value of the difference between the conditions. The means for accomplishing this filtering may be described in either the attribute or the profile. (Here, it is not described how to achieve the filtering.)

The items 1, 2 and 3 shown in Table 9 presented above are operation-negotiation combinations that may be used to accomplish the filtering. The filtering for limiting audience in accordance with the auxiliary data item, the additional auxiliary data items and the profile is known as "personalization" or "localization."

Figure 5:
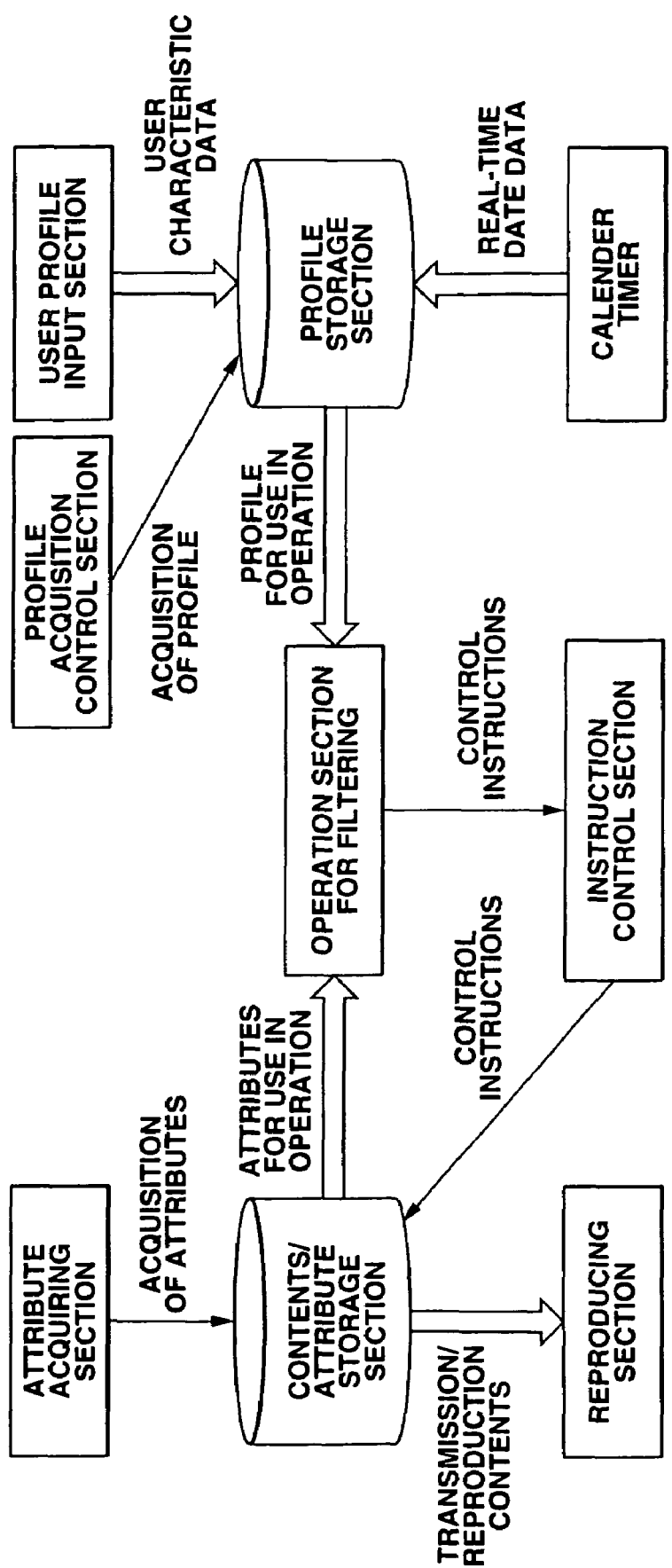
FIG. 5 is a diagram explaining how an operation is performed to achieve filtering.
Figure 6:
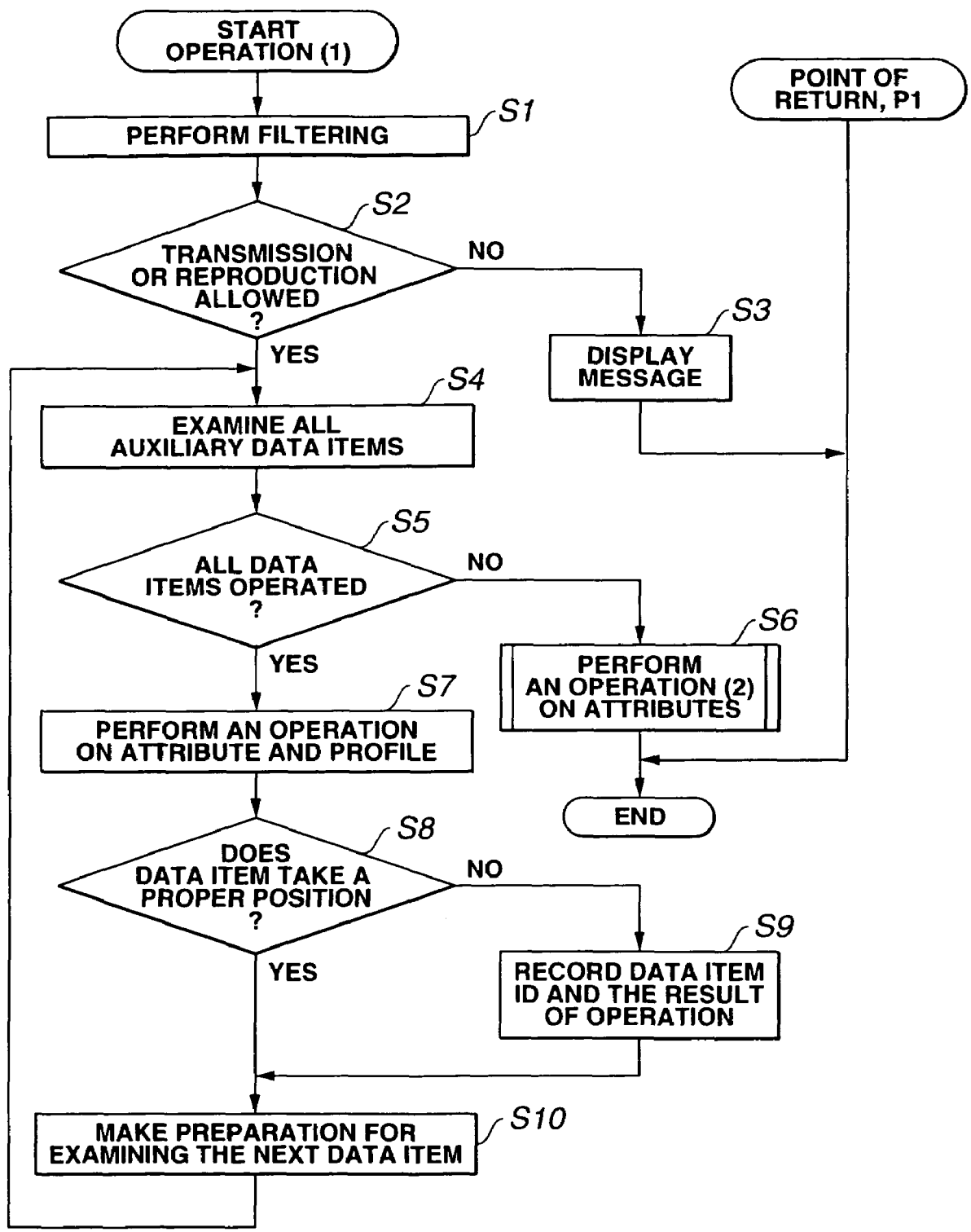
FIG. 6 is a flowchart explaining how the auxiliary data items contained in a program are classified.
Figure 7:
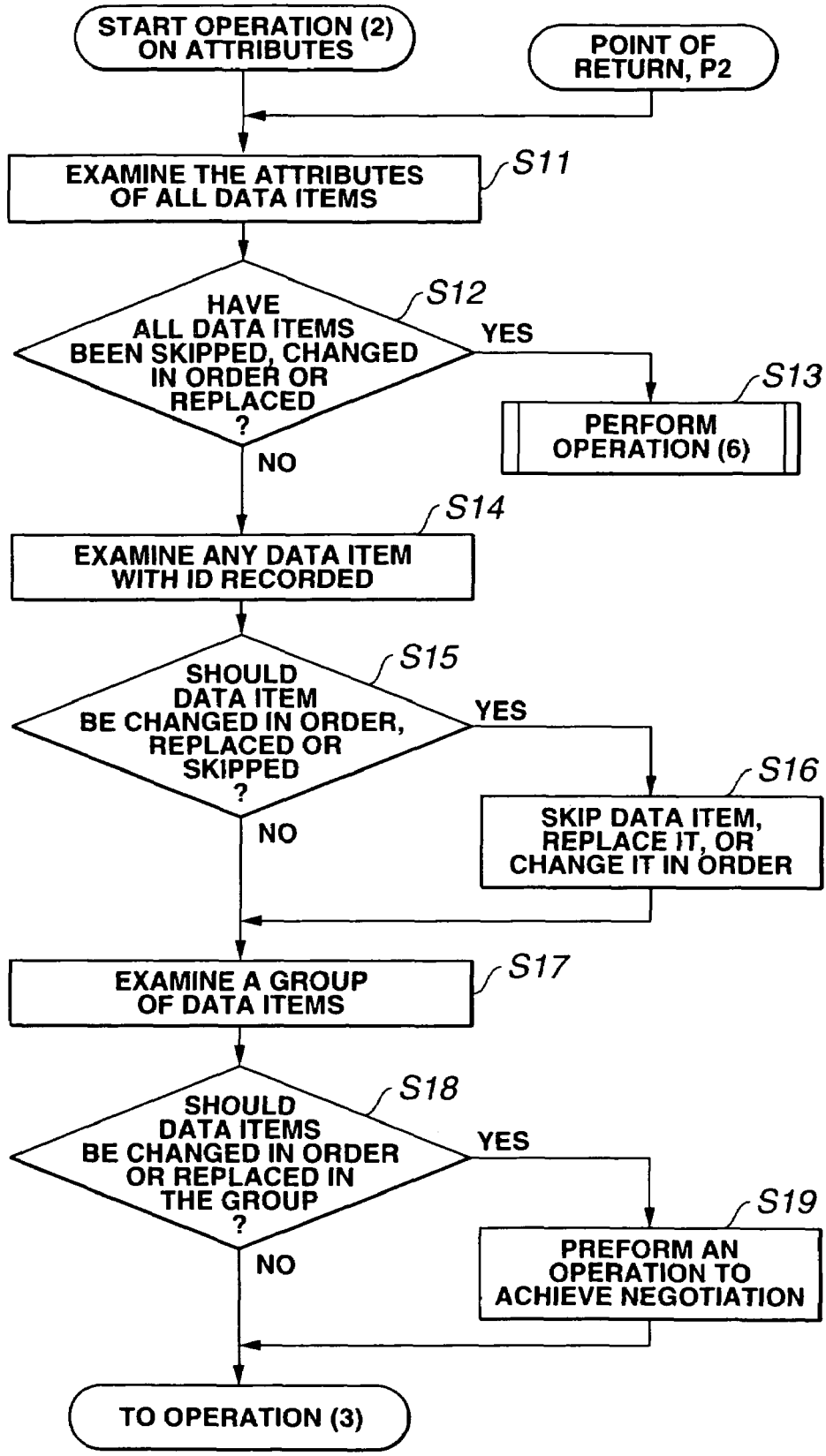
FIG. 7 is a flowchart showing how the auxiliary data items contained in a program are classified.

When operations are performed in order to accomplish this filtering, the attribute of any contents that can no longer be transmitted or reproduced may effects, in some case, an operation to assign the right that will be described later (see FIG. 5).

The auxiliary data items constitute a part of the program. Therefore, operations need not be performed on the attribute if the auxiliary data items or the profile if the program data is filtered as an operation is effected on the attribute of the program data and the profile.

2. Filtering According to a Transmission/reproduction Validation Term

A recording apparatus or a reproducing apparatus usually has the function of detecting, in real time, the date and time in the area in which the apparatus is located. The date and time detected in the apparatus are applied to the profile.

The attribute of the program data, the attribute of each auxiliary data item, and the attribute of each additional auxiliary data item describe the terms during which the contents of these data items remain valid.

Another of the operations to be performed on the profile and the attribute is the matching of the date-time data and the validation term the profile and the attribute have, respectively. If the results of this operation show that the validation term of the contents has expired, the contents cannot be transmitted or reproduced. The validation term described in the attribute may be indefinite. In this case, no limitation to the transmission or reproduction of the contents exists in effect.

As the result of the operation performed to accomplish this filtering, the contents may not be transmitted or reproduced.

If so, the attribute of the contents may carry out, in some case, an operation to assign the right that will be described later (see FIG. 5).

3. Negotiation Over the Assignment of Right

Among the operations to be performed on attributes is one that is effectuated to assign a right.

The operation for assigning the right may produce four results. Result 1 allows changes in the order of auxiliary data items. Result 2 prohibits changes in the order of auxiliary data items. Result 3 allows an auxiliary data item to replace another. Result 4 prohibits an auxiliary data item from replacing another. Results 1 and 2 concern the change in the order of adjacent auxiliary data items. Results 3 and 4 concern the replacement of an auxiliary data item incorporated in the program data with an additional auxiliary data item introduced from outside.

There are three conditions of assigning the right. Condition A is to assign the right unconditionally. Condition B is not to assign the right at all. Condition C is to assign the right if a condition or conditions are satisfied.

The right-assignment results and the right-assignment conditions provide six combinations possible for the operation. Combination 1 is to allow the order of auxiliary data items, unconditionally. Combination 2 is to prohibit the change in the order of auxiliary items, unconditionally. Combination 3 is to allow the change in the order of auxiliary data items, if a condition or conditions are satisfied. Combination 4 is to allow the replacement of an auxiliary data item with another, unconditionally. Combination 5 is to prohibit the replacement of an auxiliary data item with another, unconditionally. Combination 6 is to allow the replacement of an auxiliary data item with another, if a condition or conditions are satisfied.

Any auxiliary data item may not be transmitted or reproduced due to either 1. the filtering for limiting audience or 2. the filtering according to a transmission/reproduction validation term. If this is the case, the auxiliary data item is regarded as having been subjected to an operation to assign the right.

If there is found no other auxiliary data item or no additional auxiliary data item, which may be changed in order with, or replaced by, that auxiliary data item, it is impossible to assign the right at all. Thus, the auxiliary data item so considered will be skipped, not transmitted no reproduced.

The attribute of the auxiliary data item may describe a right-assignment condition of allowing the assignment of right unconditionally (either combination 1 or combination 4) and there may be an auxiliary data item or an additional auxiliary data item that can be changed in order with, or replaced by, that auxiliary data item. In this case, the auxiliary data item will be first changed in order with, or first replaced by, the other auxiliary data item or additional auxiliary data item that has the highest priority (for example, the data item that immediately follows the auxiliary data item).

The attribute of the auxiliary data item may describe a right-assignment condition of prohibiting the assignment of right unconditionally (i.e., combination 2 or combination 5). In this case, the auxiliary data item so considered will be skipped.

Combinations 3 and 6, both for allowing the assignment of right if a condition or conditions are satisfied, will be described below.

The conditions that should be satisfied to allow the assignment of right are as follows. That is, the attribute of the auxiliary data item described the following items (set forth in parentheses) as the object of operations.

A. Assignment of Right to an Auxiliary Data Item Designated or an Additional Data Item Designated The attribute of the auxiliary data item to be changed in order with, or replaced by, another auxiliary data item or an additional auxiliary data item may designate the other auxiliary data item or the additional auxiliary data item. If so, the auxiliary data item will be changed in order with, or replaced by, the other auxiliary data item designated or the additional auxiliary data item designated.

B. Assignment of Right to a Data Item Satisfying the Profile Condition

This takes place to change any auxiliary data item skipped, in order with, or to replace the same by, another auxiliary data item or an additional auxiliary data item. Note that the other auxiliary data item or the additional auxiliary data item has been selected in accordance with the result of an operation effected on the profile condition and the attribute of the other auxiliary data item and the additional auxiliary data item.

The operation may be similar to the operation performed in the filtering (1) for limiting audience or the filtering (2) according to a transmission/reproduction validation term, as will be exemplified below.

An example of the operation is carried out on the living area, age, income, job, language, hobby and the like of the user, the data item showing whether the other personal data items may be disclosed or not, the living area, age, income, job, language, hobby and the like of audience to which the program is dedicated. Note that these items of the audience are described in the attribute of the auxiliary data item or additional auxiliary data item.

As in the filtering (1) for limiting audience or the filtering (2) according to a transmission/reproduction validation term, logic sum (OR) and logic product (AND) of these conditions can be made, and the degree of matching of conditions may be presented in terms of points, thereby providing numerical value of the difference between the conditions. The means for accomplishing this filtering may be described in either the attribute or the profile. (Here, it is not described how to achieve the filtering.)

A group of auxiliary data items, each having priority described, or a group of additional auxiliary data items, each having priority described, will be explained below. Before achieving the assignment B of right, or any one of assignments C, D and E later descried, a group of auxiliary data items or additional auxiliary data items is prepared. Any one of these data items may be selected to change the order of the auxiliary data item of interest or to replace the same. Those of the data items of the group, which satisfy the conditions of assignments B, C, D and E, may be selected as auxiliary data items or additional auxiliary data items.

C. Assignment of Right to a Non-conflicting Party

The assignment of right can be prohibited if the assignor and the assignee conflict with each other in terms of product or service they manufacture or provide.

In the case of contents composed of a music program, auxiliary data items or additional auxiliary data items, the composer, writer, singer or player of the music may not wish to have other music contained in the same contents, which is sung, written, sung or played by other persons. If this conflict exists, the assignment of right is prohibited.

If no conflict is described in at least the attribute of the auxiliary data item or additional auxiliary data item selected to change the order of the auxiliary data item of interest or to replace the same, the assignment of right will not be prohibited.

In order to check conflict, a list of conflicting parties may be stored in the attribute. Instead, the list of conflicting parties may be recorded in an external file. The external file may then be referred to in the process of an operation, thereby to determine whether the assignee is a conflicting party to the assignor.

D. Assignment of Right Concerning Real-time Synthesized Data Item

An hour announcement or a weather forecast may be synthesized with other data items, thus forming multimedia contents, in a transmitting apparatus or a reproducing apparatus. For example, the hour data may be read from a calendar timer and automatically synthesized with audio data or image data, thus generating an additional auxiliary data item. Weather data may be acquired from a whether forecasting company and automatically synthesized with audio data or image data, thereby generating an additional auxiliary data item.

In the filtering (2) according to a transmission/reproduction validation term, an operation is performed on the time recorded in the profile and the validation term described in the attribute of the auxiliary data item of interest. From the result of the operation, the auxiliary data item of interest may be found no longer valid. Even in this case, real-time synthesized hour-announcement data or real-time synthesized whether-forecast data can be assigned, if the attribute of the auxiliary data item describes "a real-time synthesized data item can be assigned" and if other conditions do not prohibit the assignment.

E. Assignment of Right for an Equivalent Such as Money

To skip an auxiliary data item incorporated in the program data, it is determined to which auxiliary data item or additional auxiliary data item should be assigned with the right. Which data item should be given the right is determined by performing an operation on (or by comparing) the equivalent offered by the auxiliary data item or additional auxiliary data item and the equivalent demanded by the data item to be skipped.

4. Amount of Equivalent and Means of Payment (How Much Should be Paid to Whom and When)

Assume that the auxiliary data item of interest has been changed in order with, and replaced by, an auxiliary data item or an additional auxiliary data item, in accordance with the above-mentioned conditions 1 to 3.

The data concerning the payment of equivalent for changing the order of data item or replacement of data item is described in the attribute of the data item. In other words, the attribute describes the data about the charging and settlement of equivalent.

The settlement, i.e., an operation on this attribute and the profile, is carried out even if the data item of interest has been changed in order with, or replaced by, an auxiliary data item or an additional auxiliary data item. The settlement can be effected in, for example, the recording apparatus or the reproducing apparatus. Therefore, it suffices to transmit only the result of settlement. This helps to decrease the traffic of information on the network.

It is determined whether the auxiliary data item of interest, which is contained in the program should be 1) transmitted or reproduced, 2) skipped, 3) changed in order with another auxiliary data item or an additional auxiliary data item, or 4) replaced by another auxiliary data item or an additional auxiliary data item. How it is determined will be described with reference to FIGS. 6 to 10.

First, an operation is performed on the attribute of the program selected and the profile for selecting the program, and filtering is carried out (Step S1).

Next, it is determined whether the transmission or reproduction of the program has been allowed or not (Step S2). In other words, it is determined whether the program is an appropriate one for the reproducing apparatus (user). Thus, adult contents, for example, can be kept away from children. The areas to which the program may be transmitted can thereby be limited. Further, the language in which the program may be presented can thereby be limited.

Step 2 corresponds to the negotiation 1 (filtering for limiting audience) and the negotiation 2 (filtering according to a transmission/reproduction validation term).

If NO in Step S2, a message is displayed (Step S3), informing the user that the program selected is not good for the profile and therefore cannot be transmitted or reproduced. The process is then terminated.

If YES in Step S2, the attributes of all auxiliary data items incorporated in the program are examined (Step S4).

Then, it is determined whether the attributes of all auxiliary data items have been operated, together with the profile (Step S5). If YES in Step S5, that is, if an operation has been effected on the attributes and the profile, the process goes to Step S6. In Step S6, the attributes will be subjected to an operation, as will be explained later with reference to FIG. 7.

If No in Step S5, that is, if the no operations have been effected on the attributes and the profile, the process goes to Step S7. In Step S7, an operation is performed on the attribute of an auxiliary data item and the profile to determine whether the auxiliary data item takes a proper position in the program. That is, the operation is carried out to determined whether each auxiliary data item incorporated in the program is appropriate or not for the reproducing apparatus (user). Whichever data item necessary, the validation term, area, language, job, age, sex or the like, is acquired from the profile and subjected to the operation.

Then, it is determined whether or not the auxiliary data item takes a proper position in the program (Step S8). If NO in Step S8, the process goes to Step S9, in which the auxiliary data item ID and the result of the operation are recorded in a storage area RM. The process then goes to Step S10. That is, if the auxiliary data item is appropriate or not for the reproducing apparatus (user), it takes its initial position in the program.

If YES in Step S8, the process goes to Step S10, in which preparation is made to examine the next auxiliary data item in the program. Then, the process returns to Step S4. Thus, if the first auxiliary data item takes a proper position in the program, it will be skipped, changed in order with, or replaced by, another auxiliary data item. To skip, change the position or replace the first auxiliary data item, an operation (2) is effected on the attributes of the auxiliary data items, as will be explained below, with reference to FIG. 7.

In the operation (2) (FIG. 7) on the attributes of auxiliary data items, any auxiliary data item that has an ID recorded in the storage area RM is examined (Step S11) to determined if it has been skipped, changed in order, or replaced.

Then, it is determined whether all such auxiliary data items recorded in the storage area RM have been skipped, changed in order, or replaced (Step S12). If YES in Step S12, a charge-settling operation (5) shown in FIG. 10 (Step S13).

If NO in Step S12, the process goes to Step S14. In Step S14, any auxiliary data item having an ID recorded in the storage area RM is examined to determine if the attribute of the data item describes that the data item should be changed in order with, or replaced by, another auxiliary data item or an additional auxiliary data item, or should be skipped.

Next, in Step S15, it is determined whether or not the attribute of the data item describes that the data item should be so processed. If YES in Step S15, the process goes to Step S16, in which the auxiliary data item is skipped, changed in order, or replaced. Step S16 corresponds to Condition A of negotiation 3, i.e., the assigning of the right to an auxiliary data item designated or an additional data item designated.

If NO in Step S15, the process goes to Step S17. In Step S17, a designated group of data items recorded in the storage area RM to determine if the attribute of any auxiliary data item having an ID describes that the data item should be changed in order with, or replaced by, another auxiliary data item or an additional auxiliary data item of the designated group.

Then, it is determined whether or not any data item of the designated group should be changed in order or replaced with any other data item of the same group (Step S18). If YES in Step S18, the process goes to Step S19. In step S19, an operation is performed to achieve a negotiation between the auxiliary data item of interest and any other auxiliary data item or additional data item of the designated group. This operation corresponds to Operation A of the negotiation 3, i.e., the assignment of right to an auxiliary data item designated or an additional data item designated.

Figure 8:
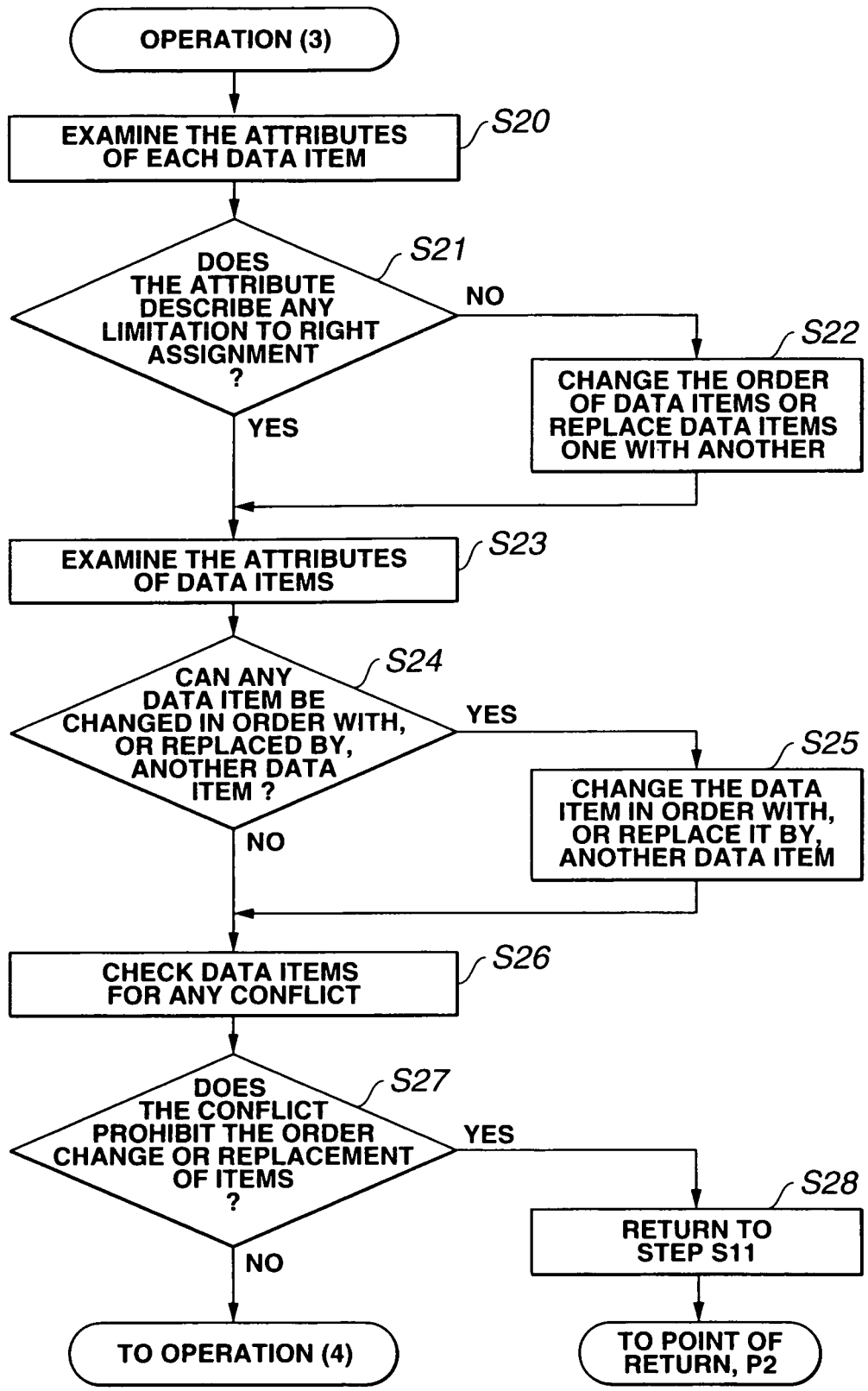
FIG. 8 is a flowchart illustrating how the auxiliary data items contained in a program are classified.

If NO in Step S18, the process goes to an operation (3), which will be described with reference to FIG. 8. As shown in FIG. 8, the attribute of each auxiliary data item having an ID recorded in the storage area RM is examined to determine if the attribute describes any limitation to the assignment of right (Step S20).

It is then determined whether or not the attribute describes any limitation to the assignment of right (Step S21). If NO in Step S21, the process goes to Step S22. In Step S22, any auxiliary data item having an attribute that does not describe such a limitation is changed in order with, or replaced by, another data item in accordance with the result of the operation. More specifically, the change in order and the replacement is effected in accordance with the result of the operation performed on the attributes of the data items. This operation corresponds to Condition B of the negotiation 3, i.e., the assignment of right to any data item that satisfies the profile condition. Here, any data items that are free of Conditions C to E of the negotiation are processed prior to the other data items.

If YES in Step S21, the process goes to Step S23. In Step S23, the attributes of the data items are examined to determine if any auxiliary data item can be changed in order with, or replaced by, an auxiliary data item or additional auxiliary data item that is a real-time synthesized one.

Then, it is determined whether or not any auxiliary data item can be changed in order with, or replaced by, such an auxiliary data item or additional auxiliary data item (Step S24). If YES in Step S24, the process goes to Step S25. In Step S25, an auxiliary data item is changed in order with, or replaced by, a real-time synthesized auxiliary data item or additional auxiliary data item, in accordance with the attribute of the auxiliary data item. Step S25 corresponds to Operation D of the negotiation 3, i.e., the assignment of right concerning real-time synthesized data item.

If NO in Step S24, the process goes to Step S26. In Step S26, the data items are checked for any conflict. More precisely, the attributes of the data items are subjected to an operation, thus finding whether the data items conflict with one another. In other words, it is determined whether the data items cannot be changed in order or replaced with one another.

Then, in Step S27, it is determined whether or not there is any conflict to prohibit the order change or replacement of the data items. If YES in Step S27, that is, if the data items cannot be changed in order or replaced with one another due to the conflict, the process goes to Step S28. In Step S28, the process returns to Step S11 (FIG. 7), i.e., the point of return, P2. That is, the process is carried out again, which corresponds to Operation C of the negotiation 3, i.e., assignment of right to a non-conflicting party.

Figure 9:
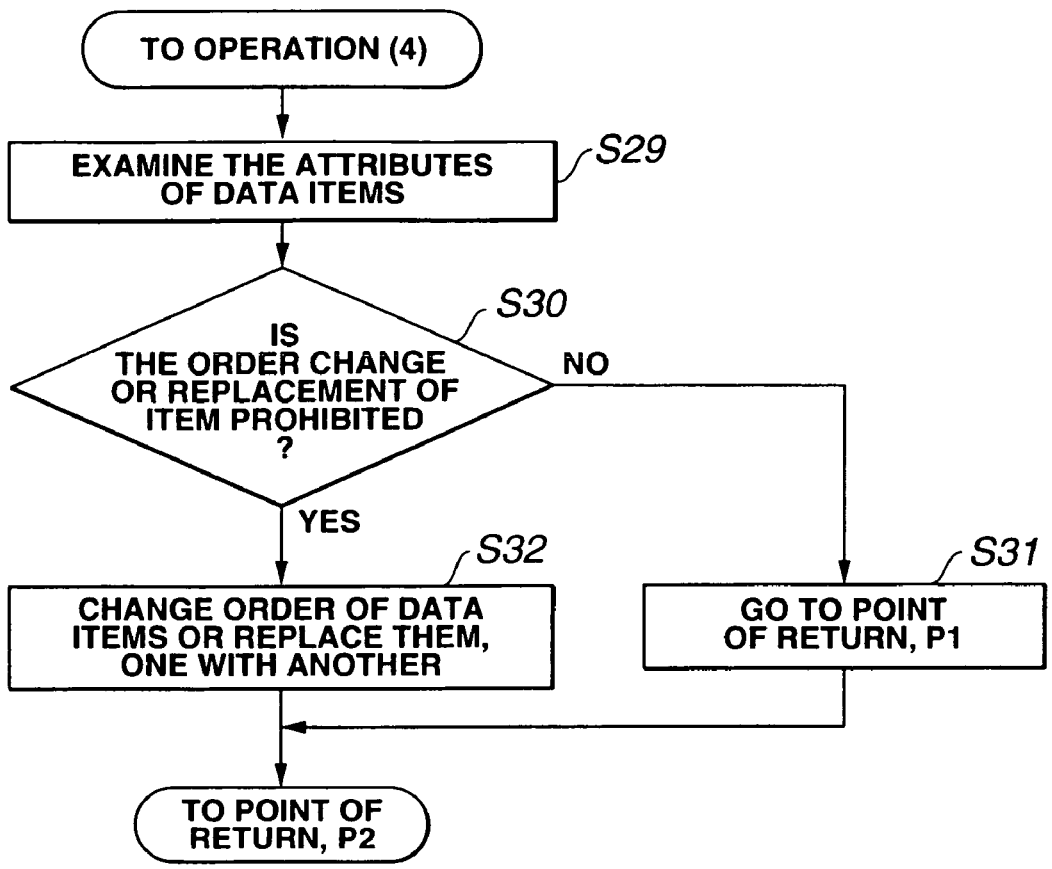
FIG. 9 is a flowchart explaining how the auxiliary data items contained in a program are classified.

If NO in Step S27, the process goes to operation (4) shown in FIG. 9. That is, the attributes of the data items are examined in Step S29 to see if any data item cannot be changed in order with, or replaced by, an auxiliary data item or additional auxiliary data item, due to some limitation concerning the condition for equivalent.

Then, in Step S30, it is determined whether such limitation exists, prohibiting the order change or replacement of data item. If YES in Step S30, any data item is not changed in order with, or replaced by, an auxiliary data item or additional auxiliary data item, due to some limitation concerning the condition for equivalent, though all conditions are satisfied in accordance with the result of the operation on the attributes of data items. Thus, in Step S31, the process returns to the point of return, P1 shown in FIG. 6, whereby the process is terminated.

If NO in Step S30, the process goes to Step S32. In Step S32, the data item is changed in order with, or replaced by, an auxiliary data item or additional data item. The process then returns to the point of return, P1 shown in FIG. 6. In this case, too, the process is terminated.

Figure 10:
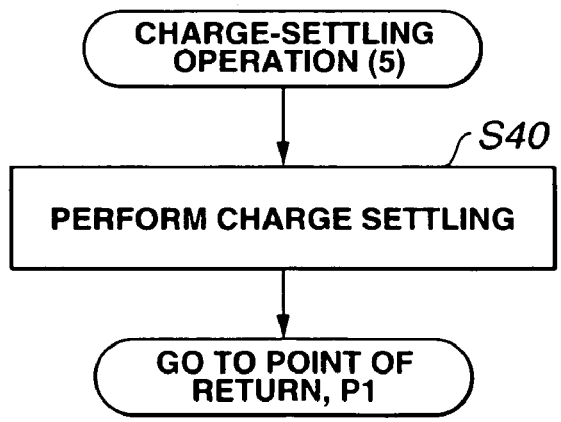
FIG. 10 is a flowchart showing how the auxiliary data items contained in a program are classified.
Figure 11:
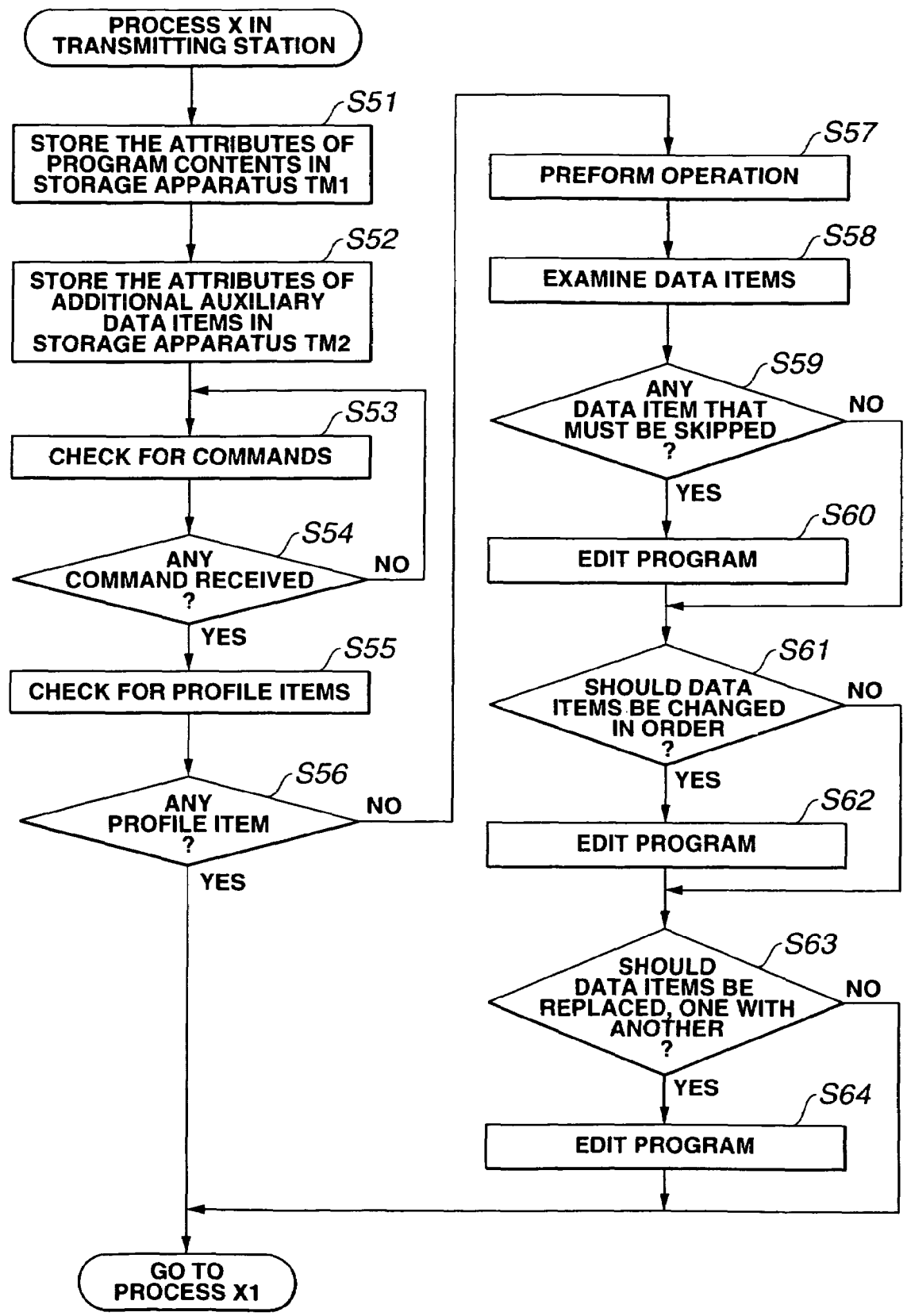
FIG. 11 is a flowchart explaining how the data-providing system operates.

In the process (5) shown in FIG. 10, the data about the charge settling among all players is generated from the attributes of all data items contained in the program, in accordance with the charge-settling instruction described in the profile. In Step S40, a charge-settling mechanism 100D settles charges. Then, the process returns to the point of return, P1 shown in FIG. 6, and is terminated.

It will be described how the data-providing system 100 shown in FIG. 4 operates, with reference to FIGS. 11 to 15.

The data server apparatus 120 provided in the transmitting station performs process X, incorporating auxiliary data items into program data and generating program contents. The Attributes of the program data and attributes of the auxiliary data items are prepared and stored into the storage apparatus TM1 that is provided in the transmitting apparatus (Step S51).

Additional auxiliary data items are prepared. Attributes of the additional auxiliary items are generated. The additional auxiliary data items and the attributes thereof are stored into the storage apparatus TM2 that is provided in the transmitting apparatus, too (Step S52). (A single storage apparatus may suffice, replacing the storage apparatuses TM1 and TM2, if the additional auxiliary data items can be distinguished from the auxiliary data items.)

It is determined if the contents control mechanism has issued transmission commands (Step S53).

It is then determined whether transmission commands have been received or not (Step S54). If NO, the process returns to Step S53. In this case, Steps S53 and S54 are repeated.

If YES in Step S54, the process goes to Step S55, in which the profile is read from the storage apparatus TM3. It is determined whether or not the profile read from the apparatus TM3 includes any item that should be considered at the time of transmission (Step S55). (A single storage apparatus may suffice, replacing the storage apparatuses TM1, TM2 and TM3, if the apparatus TM3 can be distinguished from the apparatus TM1 or TM2.)

Then, it is determined whether the profile includes such a profile item or not (Step S56). If YES, the process goes to process X1 shown in FIG. 12. If NO, an operation is performed on the profile, the program data and the attributes of the auxiliary data items, all prepared, and, if necessary, an operation on the attributes of the auxiliary data items (Step S57).

The program or the auxiliary data items are then examined to see if the auxiliary data items should be skipped, changed in order, or replaced by additional auxiliary data items (Step S58).

It is determined whether or not any data item should be skipped (Step S59). If NO, the process goes to Step S61. In Step S61 it is determined whether any data item should be changed in order or not.

If YES in Step S59, the process goes to Step S60, in which the program is edited so that the program or the auxiliary data items may be skipped. Then, the process goes to Step S61. In Step S61 it is determined whether any data item should be changed in order or not.

If NO in Step S61, the process goes to Step S63. In Step S63 it is determined whether the data items should be replaced or not.

If YES in Step S61, the process goes to Step S62. In Step S62 the program is edited so that the auxiliary data item may be replaced by one another (or so that the transmission control may be altered). Thereafter, the process goes to Step S63, in which it is determined whether the data items should be replaced or not.

Figure 12:
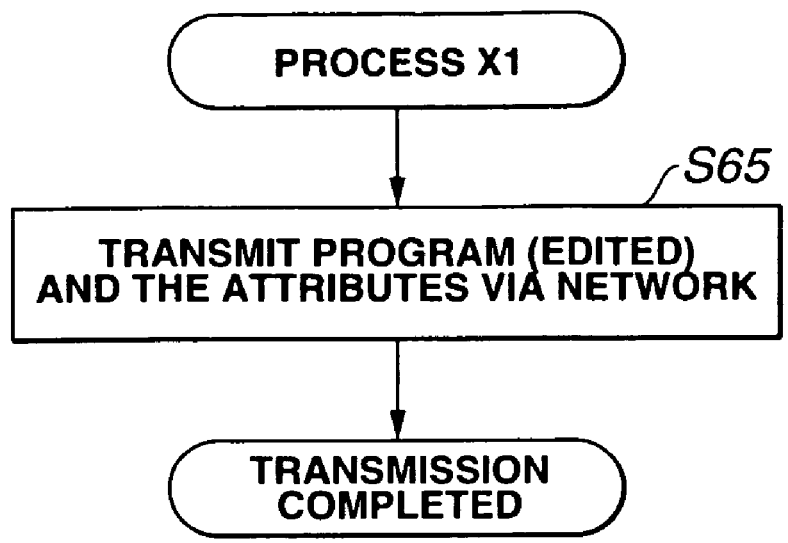
FIG. 12 is a flowchart explaining how the data-providing system operates.

If NO in Step S63, the process goes to process X1 shown in FIG. 12. If YES in Step S63, the process goes to Step S64. In Step S64, additional auxiliary data items are generated, if possible, in real time. Further, the program is edited, thereby replacing the auxiliary data items with the additional auxiliary data items (or the transmission control is altered). Thereafter, the process goes to process X1 shown in FIG. 12.

The decision steps, i.e., Step S59, Step 61 and Step S63, may be carried out in different orders. The above description may suggest that the data items undergo a badge process, skipped, changed in order or replaced, all at once. Nonetheless, the data items can be process, in concurrence with the transmission of the program.

The contents can be transmitted in two methods. In the first method, the contents are first edited and then transmitted in units, one unit after another. In the second method, the contents are transmitted in real time, with each unit edited immediately before transmitted, in accordance with newly prepared control instructions. In the second method, the contents may be transmitted on the fly, not in real time.

In the process X1 shown in FIG. 12, the program edited in accordance with the instructions made by the contents output control section and the attributes corresponding to the program are transmitted through the network (Step S65).

Figure 13:
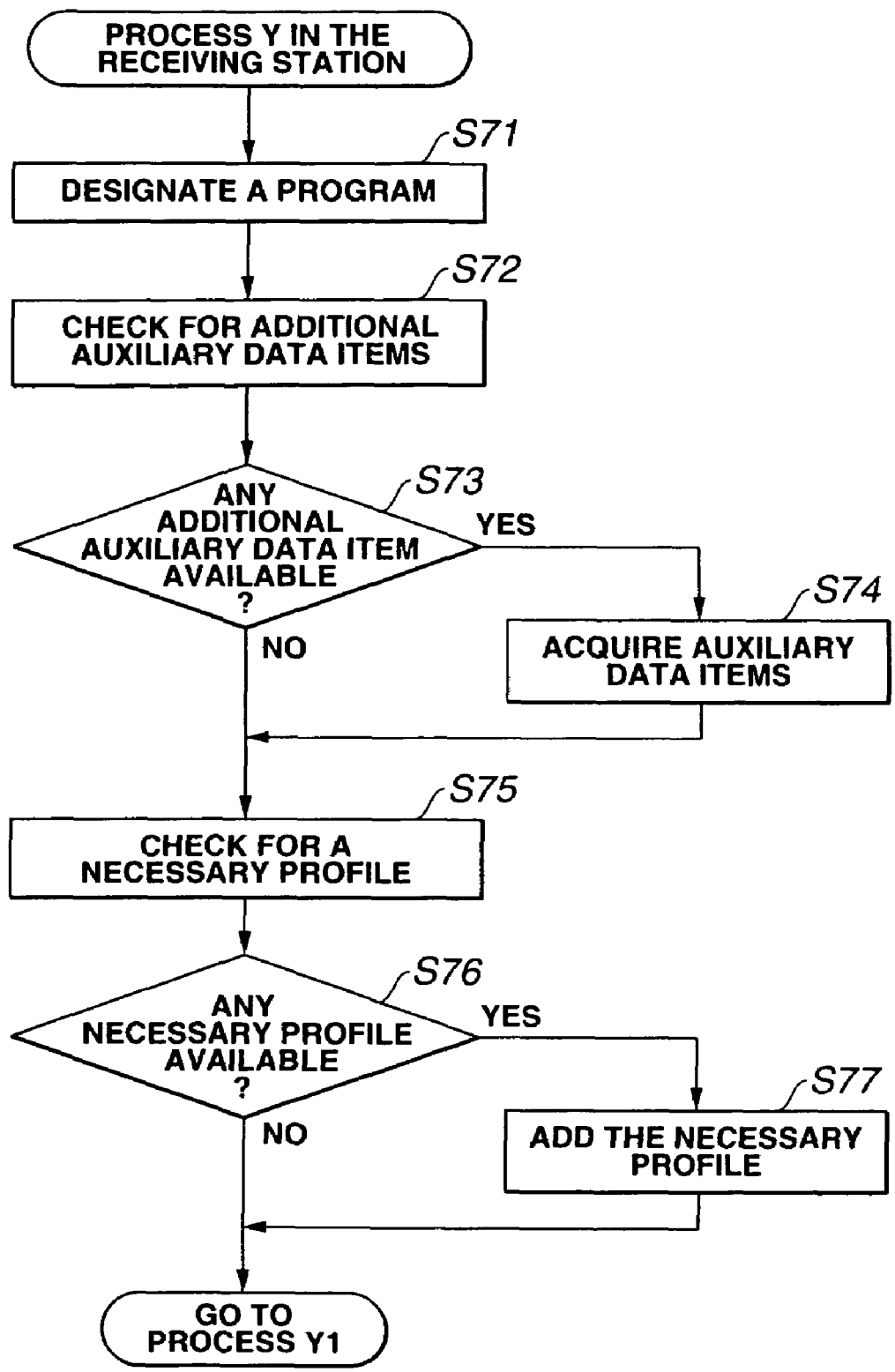
FIG. 13 is a flowchart explaining how the data-providing system operates.

At the process Y in the user's data terminal apparatus 110, the user designates a program he wants to receive (Step S71), as is illustrated in FIG. 13.

If necessary, a search is carried out for additional auxiliary data items that are available for the program designated (Step S72). Additional auxiliary data items can be acquired by means of off-line search or from the attributes of the program.

It is then determined whether additional auxiliary data items are available or not (Step S73). In YES, the process goes to Step S74. In Step S74, additional auxiliary data items are obtained via the network or from a package media such as a CD or a DVD. The data items thus obtained are stored, if necessary, into a storage apparatus RM1, (If the data items are obtained from a package media, they may be used without being processed.), and the process goes to Step S75.

If NO in Step S73, the process goes to Step S75. In Step S75, the data items are checked to see if there is a profile necessary to the program. The necessary profile can be acquired by means of an off-line/on-line search or from the attributes of the program.

Then, it is determined whether a profile necessary to the program is available or not (Step S76). If YES, the process goes to Step S77. In Step S77, the necessary profile is added and stored into the storage apparatus RM2 that is provided in the receiving apparatus. (A single storage apparatus suffices, replacing the apparatuses RM1 and RM2, if the apparatuses RM1 and RM2 can be distinguished from each other.) Then, and the process goes to process Y1 in FIG. 14.

Figure 14:
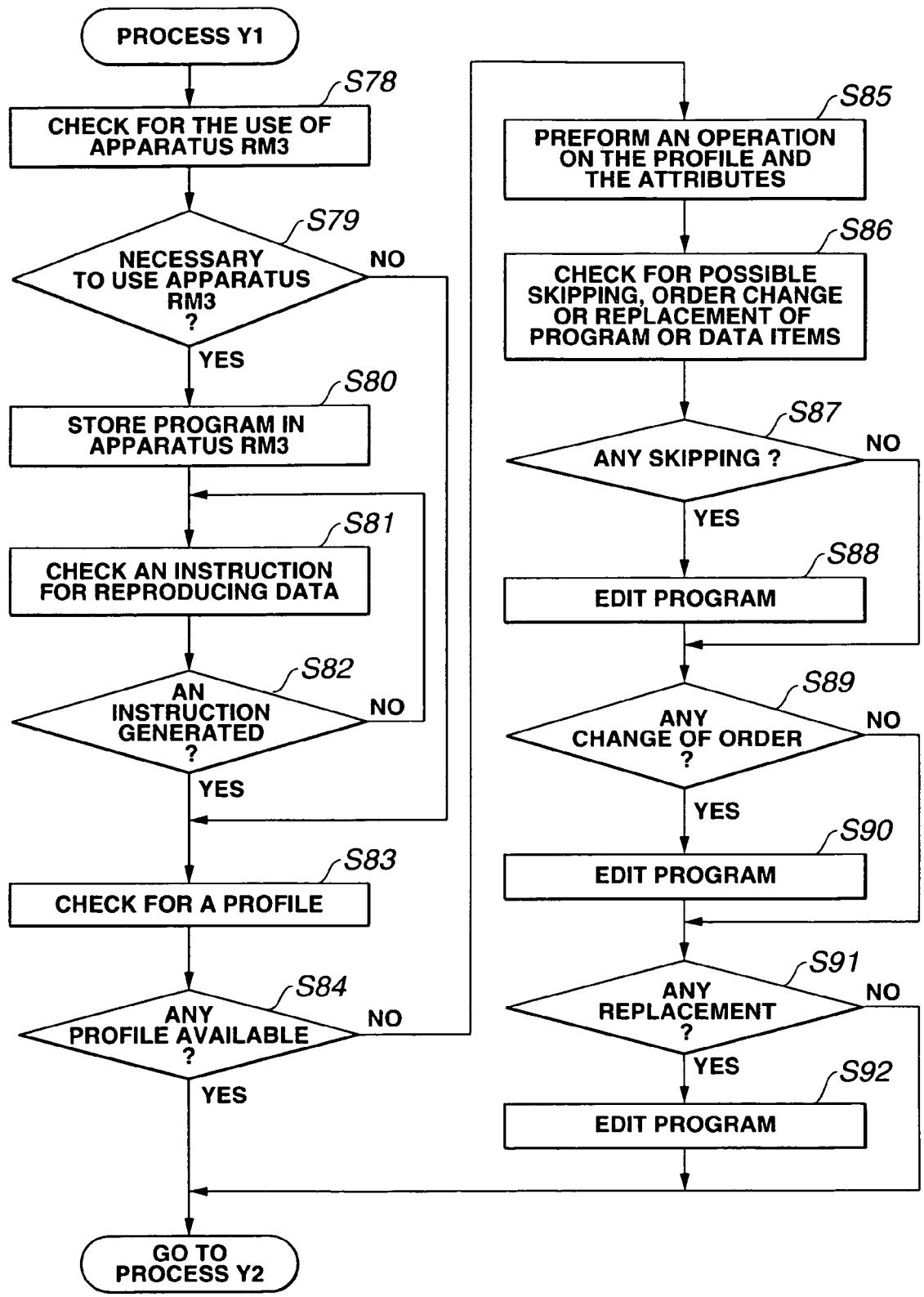
FIG. 14 is a flowchart explaining how the data-providing system operates.

If NO in Step S76, the process goes to the process Y1 shown in FIG. 14. First, it is determined if the program is reproduced by storing the received program signals into a storage apparatus RM3 or without storing them into the storage apparatus RM3 (Step S78).

Then it is determined whether or not it is necessary to use the storage apparatus RM3 (Step S79). If NO, the process jumps to Step S83. If YES, the process goes to Step S80. In Step S80, the program is stored into the storage apparatus RM3. (A single storage apparatus suffices, replacing the apparatuses RM1, RM2 and RM3, if the apparatus RM3 can be distinguished from the apparatuses RM1 and RM2.)

Next, it is determined whether instructions have been generated to reproduce the program (Step S81). (The instruction may describe that the program be reproduced while being recorded at the same time.)

It is determined whether or not an instruction has been generated to reproduce the data stored in the storage apparatus RM3 (Step S82). If NO, the process returns to Step S81. If YES, the process goes to Step S83. In Step S83, the profile is read from the storage apparatus RM2, and it is determined whether the profile read includes any item that should be considered in connection with the attribute of the program, in preparation for the reproduction of the program contents.

It is then determine whether such a program item is available or not (Step S84). If YES, the process goes to process Y2 shown in FIG. 15. If NO, the process goes to Step S85. In Step S85, an operation is effected on the profile and the attributes of the program data and auxiliary data items. If necessary, another operation is performed on the attributes of the program data.

Then, the program or the auxiliary data items are examined to see if they may be skipped and if the auxiliary data items may be changed in order or replaced by additional auxiliary data items (Step S86).

It is determined whether the program or the auxiliary data items should be been skipped or not (Step S87). If NO, it is determined whether the auxiliary data items should be changed in order or not (Step S89).

If YES in Step S87, the program is edited (or the transmission control is altered) so that the program or the auxiliary data items may be skipped (Step S88). Thereafter, it is determined whether the auxiliary data items should be changed in order or not (Step S89).

If NO in Step S89, it is determined whether or not the auxiliary data items have been replaced by additional auxiliary data items (Step S91).

If YES in Step S89, the program is edited so that the auxiliary data items are changed in order (or the transmission control is altered) (Step S90). Thereafter, it is determined whether or not the auxiliary data items have been replaced by additional auxiliary data items (Step S91).

Figure 15:
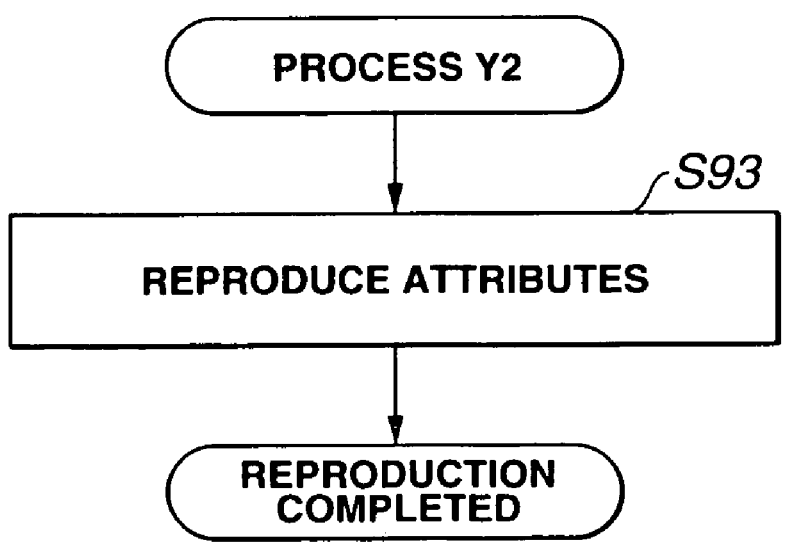
FIG. 15 is a flowchart explaining how the data-providing system operates.

If NO in Step S91, the process goes to the process Y2 shown in FIG. 15. If YES in Step S91, the process goes to Step S92. In Step S92, additional auxiliary data items are generated, if possible, in real time. Further, the program is edited, thereby replacing the auxiliary data items with the additional auxiliary data items (or the transmission control is altered). Thereafter, the process goes to process Y2 shown in FIG. 15.

The decision steps, i.e., Step S87, Step 89 and Step S91, may be carried out in different orders. The above description may suggest that the data items undergo a badge process, skipped, changed in order or replaced, all at once. Nevertheless, the data items can be process, in concurrence with the transmission of the program.

In the process Y2 shown in FIG. 15, the attributes corresponding to the program edited in accordance with the instructions supplied from the contents output control mechanism are reproduced (Step S93).

Figure 16:
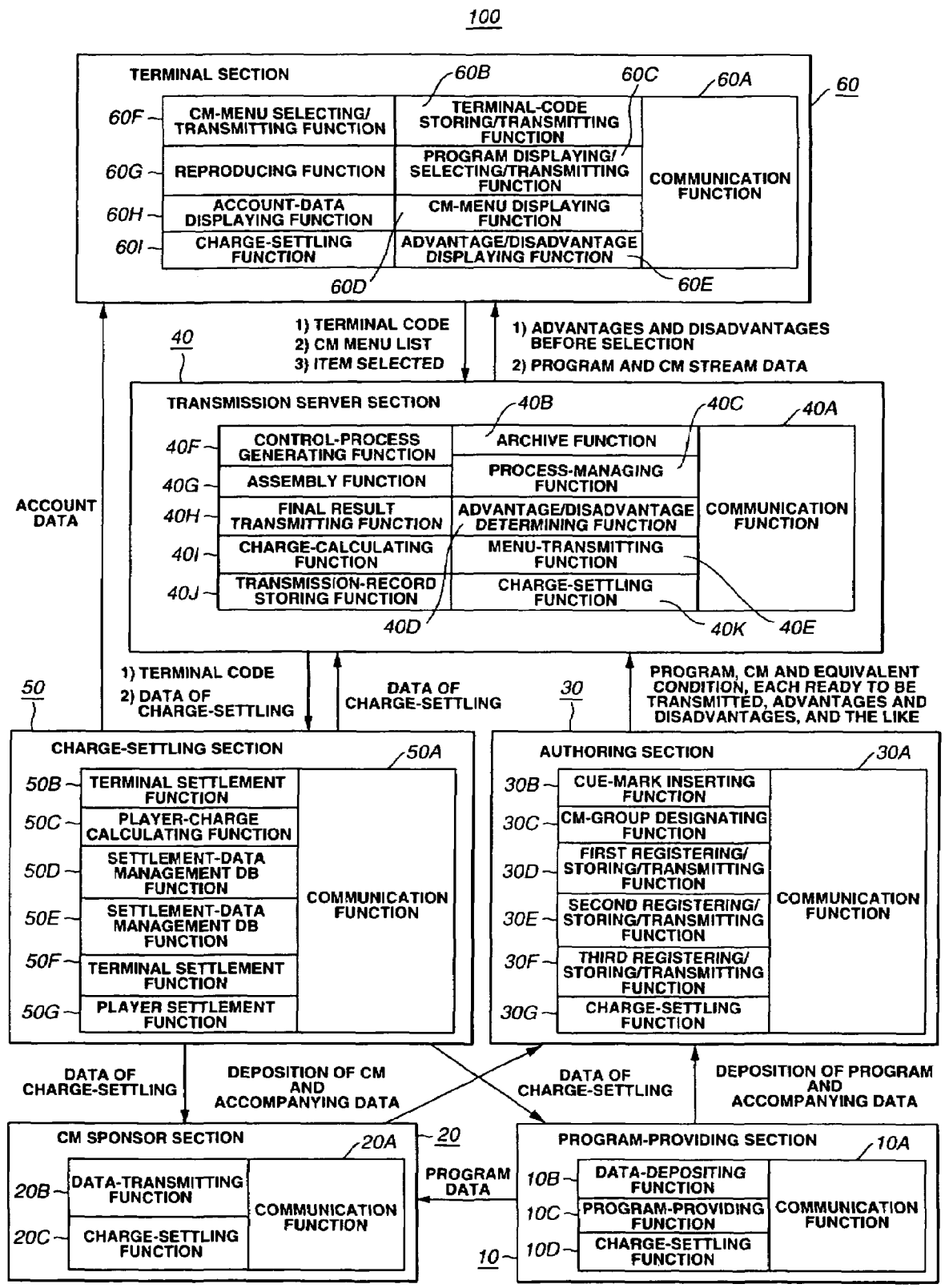
FIG. 16 is a block diagram illustrating the various sections of a data-providing system according to the present invention.

The present invention is applied to, for example, a data-providing system 100 shown in FIG. 16. The data-providing system 100 comprises a program-providing section 10, a CM sponsor section 20, an authoring section 30, a transmission server section 40, a charge-settling section 50, and a terminal section 60.

The program-providing section 10 incorporated in the system 100 has a communication function 10A of receiving data from, and transmitting data to, the CM sponsor section 20, authoring section 30 and charge-settling section 50. The program providing section 10 has a data-depositing function 10B that transmits programs and accompanying data to the authoring section 30. The accompanying data includes program prices for users, BY (backyard)-side program equivalent conditions, possible cue positions designated. Further, the program-providing section 10 has a program-providing function 10C that supplies program data to the CM sponsor section 20. Moreover, the program-providing section 10 has a charge-settling function 10D, which settles charges in accordance with the periodical statement sent from the charge-settling section 50 and concerning each player, i.e., a CM sponsor.

The CM sponsor section 20 provided in the data-providing system 100 has a communication function 20A, which receives data from, and transmits data to, the program-providing section 10, authoring section 30 and charge-settling section 50. The CM sponsor section 20 has a data-transmitting function 20B that transmits accompanying data to the authoring section 30. The accompanying data includes CM clips and CM equivalent conditions. Further, the CM sponsor section 20 has a charge-settling function 20C, which settles charges in accordance with the periodical statement sent from the charge-settling section 50 and concerning each player, i.e., a CM sponsor.

The authoring section 30 provided in the data-providing system 100 has a communication function 30A. The function 30A receives data from, and transmits data to, the program-providing section 10, CM sponsor section 20, transmission server section 40 and charge-settling section 50. The authoring section 30 also has a cue-mark inserting function 30B that inserts cue marks, each designating a position in a program, where a CM should be inserted in a program. The data of the program and the cue mark may constitute a pair of data items that have the common program code and time code. Alternatively, the cue mark may be inserted into the data of the program, in the form of a special signal. Further, the authoring section 30 has a CM-group designating function 30C that designates at least one of CM groups included in a CM library, which should be inserted into a specified program, in accordance with the advice made by the CM sponsor section 20. The CM-group designating function 30C also allocates programs codes designating the programs into which CM groups should be inserted, in accordance with the advice made by the CM sponsor section 20. The CM groups designated by the CM-group designating function 30C will be called "CM sets" hereinafter. The authoring section 30 has a first registering/storing/transmitting function 30D. This function 30D registers, stores and transmits the program prices for users, i.e., the prices the users should pay for the programs transmitted (or not transmitted) to them. The first registering/storing/transmitting function 30D also registers, stores and transmits the BY-side program equivalent conditions, i.e., the conditions in which the suppliers (players such as CM sponsors, transmission server owners, authoring function owners, charge-settling function owners, program providers and the like) transmit (or do not transmit) programs. The authoring section 30 has a second registering/storing/transmitting function 30E, which determines the order in which the CM sets prepared for a certain program should be transmitted, in accordance with the advice made by the CM sponsor section 20. The function 30E stores the order thus determined, as a CM-transmission list. The function 30E registers, stores and transmits the CM advantages and disadvantages that the users may have when CMs designated in the CM-transmission list are transmitted (or not transmitted). The authoring section 30 further has a third registering/storing/transmitting function 30F. This function 30F registers, stores and transmits the BY-side CM equivalent conditions specifying the equivalents which should be paid among the suppliers (players such as CM sponsors, transmission server owners, authoring function owners, charge-settling function owners, program providers and the like) when the CMs included in the CM-transmission list are transmitted (or not transmitted). The authoring section has a charge-settling function 30G, too. The charge-settling function 30G settles charges in accordance with the periodical statement sent from the charge-settling section 50 and concerning each player, i.e., each authoring function.

The authoring section 30 having various functions 30A to 30G can insert cue marks, each being a signal indicating where in a program a CM can be inserted. A cue mark is nothing more than a trigger. Which CM should be inserted in the program is determined from the CM-transmission list and the CM set. CM groups to be inserted later can therefore be easily interchanged. CM numbers may be allocated to the positions of cue marks, thereby to hold signals, each of which neglects or adopts a cue mark. The authoring section 30 can designate (upon receipt of an advice from a CM sponsor) a plurality of CM groups that should be inserted into a specific program from many CM libraries. The authoring section 30 can determine (upon receipt of an advice from a CM sponsor) the order in which the CM sets prepared for a program should be transmitted. The authoring section 30 can hold the data showing this order, in the form of a plurality of CM-transmission lists. Further, the authoring section 30 can register, store and transmit the CM advantages of disadvantages that the user may have when the series of CMs designated in the CM-transmission lists are transmitted (or not transmitted). Moreover, the authoring section 30 can register, store and transmit the BY-side CM equivalent conditions specifying the equivalents which should be paid among the suppliers (players such as CM sponsors, transmission server owners, authoring function owners, charge-settling function owners, program providers and the like) when the CMs included in the CM-transmission lists are transmitted (or not transmitted).

The transmission server section 40 incorporated in the data-providing system 100 has a communication function 40A that receives data from, and transmits data to, the authoring section 30, charge-settling section 50 and terminal section 60. The transmission server section 40 has an archive function 40B that achieves program data containing cue marks, CM data, CM sets, program codes to be inserted, CM-transmission lists, transmission conditions and the like. The section 40 has a process-managing function 40C that receives terminal codes transmitted from the terminal section 60, selects terminals and manages the processes in the terminals. The transmission server section 40 has an advantage/disadvantage determining function 40D. The function 40D determines advantages and disadvantages from the program prices for users and the CM advantages and disadvantages. The advantages and disadvantages determined are transmitted to the terminals. The section 40 further has a menu-transmitting function 40E that transmits the data showing a program-selecting menu and a CM menu. The section 40 has a control-process generating function 40F, too, which generates a control process of receiving a CM menu and inserting or not inserting a terminal code. The transmission server section 40 further has an assembly function 40G that effects real-time assembling of any program selected and CMs to be inserted into the program, generating a program-CM assembly. The program-CM assembly is transmitted to the terminals. The section 40 has a final result transmitting function 40H that transmits the data representing the advantages and disadvantages of the program and CMs, which have been determined, to the charge-settling section 50. The section 40 has a charge-calculating function 40I, too, that calculates the equivalents to be transferred among the players, from the BY-side program equivalent conditions and the BY-side CM equivalent conditions for the CMs of each CM set. The equivalents thus calculated are transmitted to the charge-settling section 50. The transmission server section 40 also has a transmission-record storing function 40J that stores the transmission record of CMs. The section 40 has a charge-settling function 40K that settles charges in accordance with the periodical statement sent from the charge-settling section 50 and concerning each player, i.e., each transmission server function.

The transmission server section 40 having various functions 40A to 40K can determine the advantages and disadvantages the user may have when he receives a program containing CMs or does not receive the same, from the user price of the program and the CM advantages and disadvantages of the CM sets that may be inserted into the program. The section 40 can transmit the advantages and disadvantages, thus determined, to the user designated by a terminal code, as a response to a CM menu request. Further, the section 40 can receive from a terminal a signal representing the CM set selected to be inserted into a program. The section 40 can assemble auxiliary data items in real time and transmit the same in accordance with the procedure of transmitting the auxiliary data items in the form of an auxiliary-data set inserted in the programs to be transmitted to the terminal. Moreover, the section 40 can transmits the program selected by a customer using the terminal designated by a terminal, and also the advantages and disadvantages determined from the CM set inserted in the program, to the charge-settling section 50 (serving as a subscriber management system). The section 40 can transmit the advantages and disadvantages to the terminal, too. Further, the transmission server section 40 can supply charge-settling data to the DB (Database) of each player (CM sponsor, transmission server owner, authoring function owner, charge-settling function owner, program provider or the like), so that the charge-settling data may be managed in the DB. The charge-settling data shows the payments made among the suppliers (i.e., players) and calculated from the BY-side program equivalent conditions and the BY-side CM equivalent conditions for the CMs shown in the CM-transmission list inserted in the program.

The charge-settling section 50 provided in the in the data-providing system 100 has a communication function 50A. The function 50A receives data from, and transmits data to, the program-providing section 10, CM sponsor section 20, authoring section 30, transmission server section 40 and terminal section 60. The section 50 has a terminal settlement function 50B, which receives the output of the final result transmitting function 40H provided in the transmission server section 40 and settles charges for each terminal by using the data base DB. The section 50 has a player-charge calculating function 50C, which receives the charge-settling data generated by the charge-calculating function 40I of the transmission server section 40 and represents the equivalents to be settled among the players. The player-charge calculating function 50C performs charge-settling for each player by using the DB. The charge-settling section 50 also has two settlement-data management DB functions 50D and 50E. The function 50D manages settlement data for each terminal. The function 50E manages settlement data for each player. Further, the section 50 has a terminal-settlement function 50F, which achieves charge-settling for each terminal, and prepares and transmits a periodical statement for each terminal. Still further, the section 50 has a player settlement function 50G, which achieves charge-settling for each player, and prepares and transmits a periodical statement for each terminal.

The charge-settling section 50 having various functions 50A to 50G can periodically tabulate the user's advantages and disadvantages stored in the DB and managed by each terminal and can transmit a statement to the user, so that the user may accomplish charge-settlement. The section 50 can also periodically tabulate the equivalents calculated to be paid among suppliers (i.e., players such as CM sponsor, transmission server owner, authoring function owner, charge-settling function owner, program provider and the like), and can transmit a statement to each player so that the player may accomplish charge-settlement.

The terminal section 60 of the data-providing system 100 is a terminal that can receive a stream of on-demand programs via the Internet or a similar network. The section 60 has buttons that are operated to select CMs to be inserted into a program. The buttons may be provided on the remote controller for the section 60. The terminal section 60 has a communication function 60A for receiving data from, and transmitting data to, the transmission server section 40 and charge-settling section 50. The section has a terminal-code storing/transmitting function 60B, too, which reads terminal codes from the terminals and transmits the terminal codes to the transmission server section 40. The section 60 has a program displaying/selecting/transmitting function 60C, which receives and displays a program menu, selects programs from the menu, and transmits the result of program selection. Further, the terminal section 60 has a CM-menu displaying function 60D, which requests the transmission server section 40 for a CM menu (showing advantages and disadvantages, too), receives a CM menu from the transmission server section 40 and displays the CM menu it has received. The section 60 has an advantage/disadvantage displaying function 60E, too, which displays advantages and disadvantages. The section 60 has a CM-menu selecting/transmitting function 60F, which selects a CM menu and transmits the same. The section 60 has a reproducing function 60G that reproduces the content data the section 60 received. Further, the section 60 has an account-data displaying function 60H, which requests the charge-settling section 50 for account data, receives the account data and display the same. The terminal section 60 has a charge-settling function 60I, which receives a periodical statement from the charge-settling section 50 and performs charge-settling based on the statement.

The terminal section 60 having various functions 60A to 60I can select a program that the user may enjoy and transmit a CM menu request signal, together with a terminal code, in order to receive the advantages and disadvantages the user may have when the program is combined with CMs and when the program is not combined with CMs. The terminal section 60 can inform the user of the advantages and disadvantages determined from the combination of the program and the CMs, before the user selects the program. Moreover, the terminal section 60 can transmit two signals, along with its own terminal code, to the transmission server section 40. The first signal indicates that the section 60 has received a CM group that the user has selected by pushing a button. The second signal indicates that a CM set selected to be inserted in the program. If the second signal is a null signal, it means that the terminal section 60 has received no CMs.

The CMs transferred within the data-providing system 100 include ordinary advertisement data items. The CMs may include other data items, for example, the answers to the questions asked in a quiz show, special offers made to selected customers, or the items of a questionnaire, to which "YES" or "NO" should be input. The data items auxiliary to the data of program are collectively called "CMs" here.

The price of a program containing CMs need not be higher than the price of a program containing no CMs. It is important to put prices to programs in accordance with the nature of CMs, if any, inserted in a program. For instance, a program containing the answers to the questions made in a quiz show is more expensive than a program not containing the answers. If a program contains a questionnaire and if the user answers the questions, the user may be paid.

In the data-providing system 100, each program has content data, i.e., the program data, and accompanying data items A1 to A4 described below:

A1: Program Price for User

The program price for user is one the user should pay for the program he receives during a prescribed period. It is determined from, for example, the following conditions:

Basic charge=1000 yen, which the user must pay to the charge-settling section 50.

CM-insertion charge=100 yen for each CM, to be paid to the charge-settling section 50.

Charge for inserting CM 456=400 pints, which the user receives from the advertiser.

It is not stipulated that charge-settling be made every time a transaction is performed. Rather, the data concerning charge-settling is collected at the charge-settling section 50, which settle all charges.

A2: BY-side Program Equivalent Conditions

The BY-side program equivalent conditions are applied to determine which function must pay charges to which function, for any program transmitted during the prescribed period. These conditions are as follows:

The charge-settling section 50 must pay a basic charge of 300 yen to the program-providing section 10.

The charge-settling section 50 must pay 10 yen to the transmission server section 40 and 10 yen to the authoring section 30, when a CM is inserted into the program.

Figure 17:
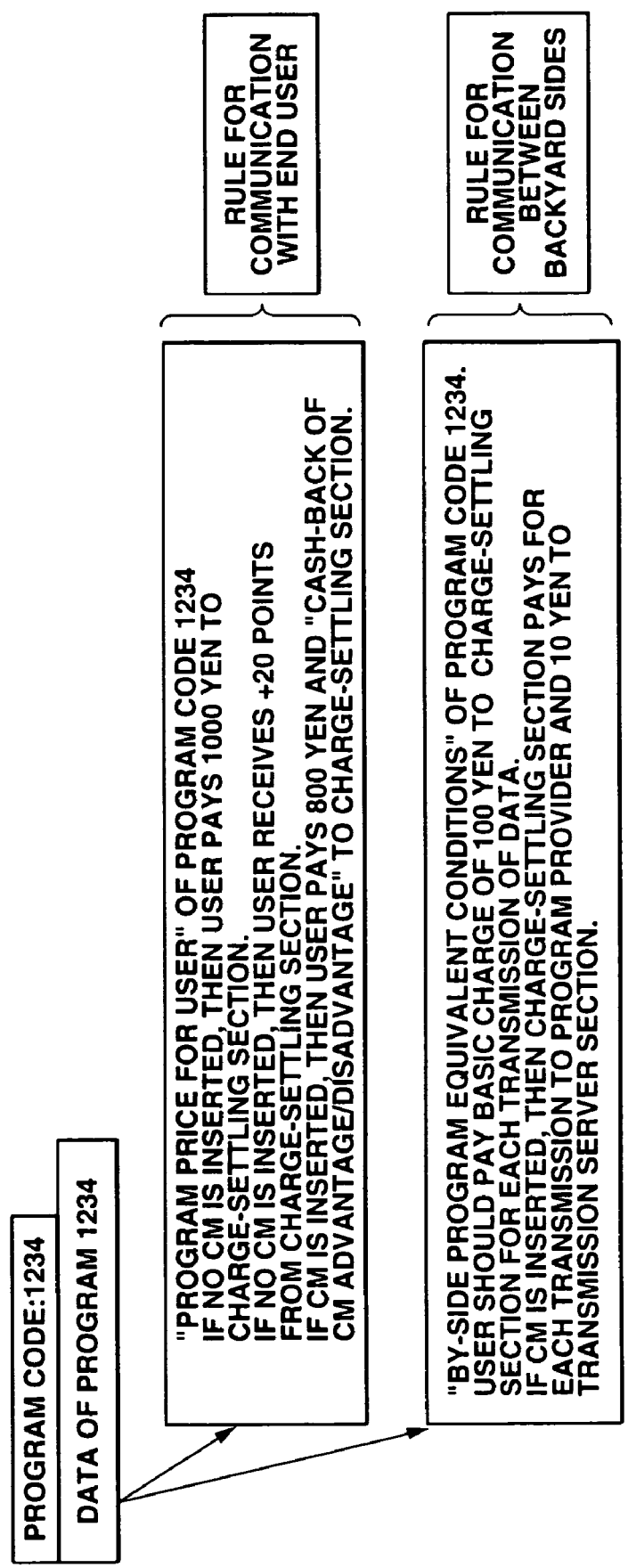
FIG. 17 is a diagram illustrating the relation between each program, on the one hand, and the price thereof and the BY-side program equivalent conditions.

FIG. 17 shows the relation that the program price for user has with the BY-side program equivalent conditions.

A3: Program Code

A program code is a code assigned to one program, identifying the program.

A4: Cue Mark

A cue mark is a special signal contained in the time-code data or program, indicating the position at which a CM should be inserted in the program.

In the transmission server section 40, the assembly function 40G performs real-time assembling of CMs, referring to the cue mark. When the cue mark is found, the section 40 stops transmitting the program. Then, the section 40 transmits the CMs in the CM set shown in the CM-transmission list, in the order described in the CM-transmission list. Immediately after the CMs terminate, the section 40 starts transmitting the program again. As long as cue marks follow one after another, the section 40 continuously transmits CMs in the prescribed order, without transmitting the program again.

Figure 18:
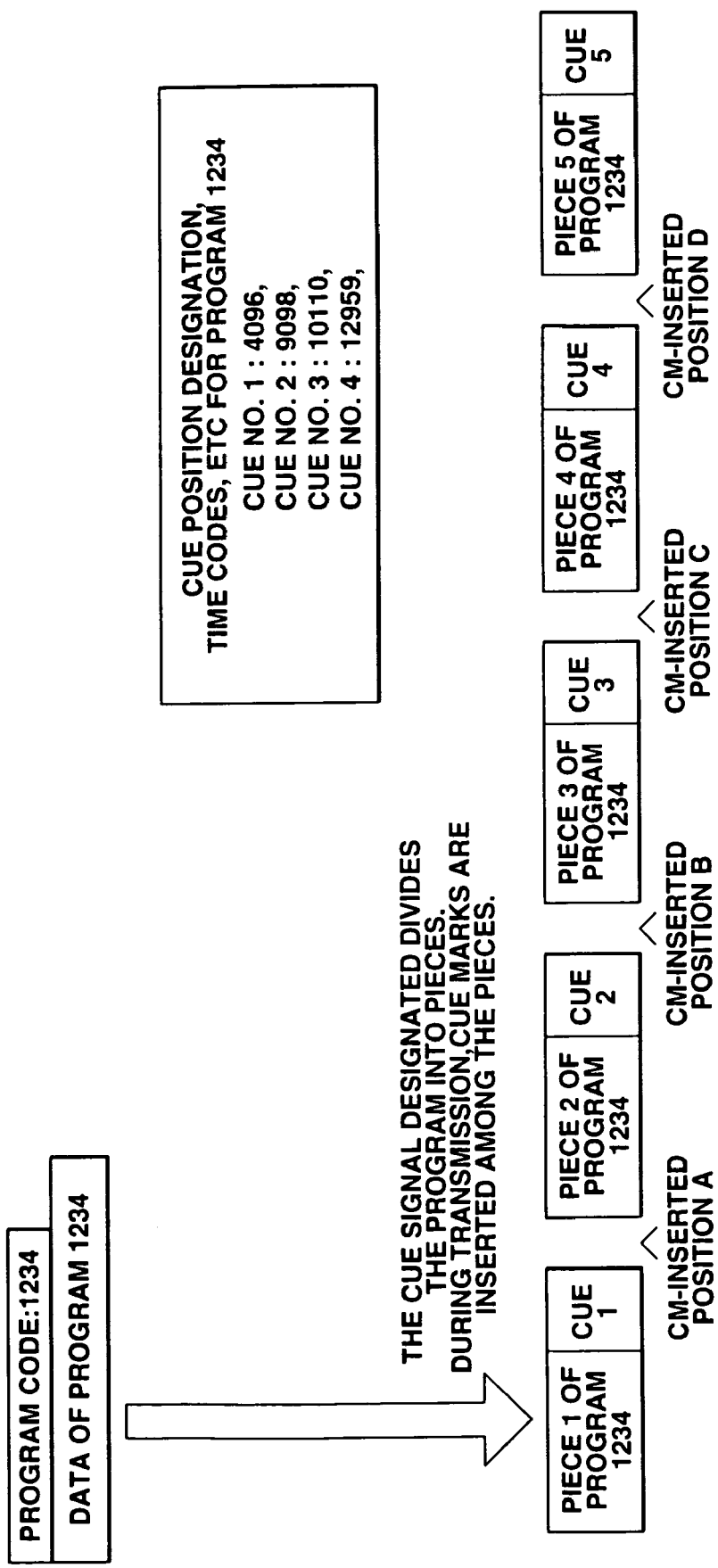
FIG. 18 is a schematic representation of program cues and CM-inserting process.

Time codes (4096, 9098, 10110 and 12959) may designate the cue positions for the data of program 1234 identified by program code 1234, as is shown in FIG. 18 or as set forth below:

Cue No. 1: 4096

Cue No. 2: 9098

Cue No. 3: 10110

Cue No. 4: 12959.

In this case, the data of program 1234 is divided into pieces 1 to 5, and cue marks are interposed among these data pieces 1 to 5. The cue marks indicate the positions A to D at which CMs will be inserted in the program.

Figure 19:
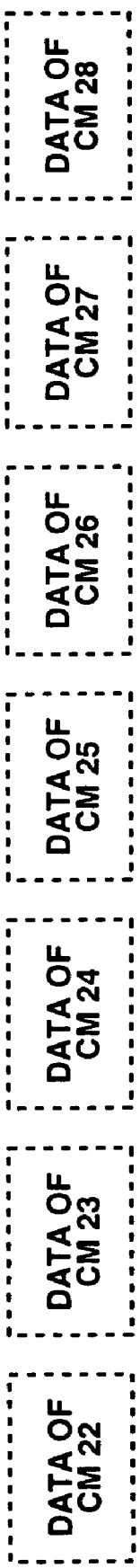
FIG. 19 is a diagram depicting the CM library incorporated in the data-providing system.

Assume that a CM library has been prepared, which is composed of CMs 22 to 28 as illustrated in FIG. 19, and that a CM set 401 to be inserted into program code 1234 is composed of CM 22, CM 23 and CM 24 as shown at A in FIG. 20. Then, a CM-transmission list shown at B in FIG. 20 is prepared. In accordance with the CM-transmission list, CM 24, CM 22 and CM 23 are inserted in the program 1234, respectively at the CM-inserting positions A, B and D, as is illustrated at C in FIG. 20. CMs 22, 23 and 24 can thereby be transmitted.

Assume that a CM set 501 to be inserted into program code 1234 is composed of CM 25, CM 26 and CM 28 as shown at A in FIG. 21. Then, a CM-transmission list shown at B in FIG. 21 is prepared. In accordance with this CM-transmission list, CM 25, CM 26, CM 27 and CM 28 are inserted in the program 1234, respectively at the CM-inserting positions A, B, C and D, as is illustrated at C in FIG. 21. CMs 25 to 28 can thereby be transmitted.

A CM set to be inserted into a program may be null. In this case, the data of the program 1234 (i.e., pieces 1 to 5) can be transmitted in the order shown in FIG. 22.

To use the CM set 401 for not only the program 1234, but also the programs 4456 and 5377, the programs in which CM sets are to be inserted have such codes as are illustrated in FIG. 23. It is natural that different CM-transmission lists be prepared, each for one program.

In the data-providing system 100, each CM is composed of CM content data and accompanying data (B1). This will be described later.

In the system 100, each cue marks is no more than a CM-inserting trigger. Which CM should be inserted at which position in a program is determined from the CM set and the CM-transmission list. The CM group to be inserted in the program can be easily replaced by another CM group. Alternatively, the ID numbers of CMs may be allocated to the cue mark positions, and signals may be stored, each signal neglecting or adopting one cue mark. This simplifies the process of transmitting CMs, to some degree.

B1: BY-side CM Equivalent Conditions

The BY-side CM equivalent conditions are applied to determine which supplier pays which supplier for the CMs transmitted during the prescribed period. These conditions are as follows:

When the CM set including the CM in question is transmitted, the CM sponsor section 20 pays 10 yen to the authoring section 30 only once, no matter how many CMs the CM sponsor section 20 has transmitted. However, the CM sponsor section 20 must pay 20 yen to the charge-settling section 50 every time it transmits a CM.

In the data-providing system 100, a CM set is composed of data C1 that is defined as follows:

C1: Name of a CM Set and the CM Group Contained in the CM Set (Methods of Designating Means for Accessing Entities).

In the data-providing system 100, a CM-transmission list is composed of the following data items D1 to D3. Two or more pairs are provided, each pair consists of one or more CM sets and a CM-transmission list. A pair consisting of one CM set and a CM-transmission list will be described.

D1: Name of the CM Set

D2: Order in Which to Transmit the CM Groups Included in the CM Set (the CM Groups May be Transmitted Repeatedly).

To broadcast the same CM repeatedly in a program, the data identifying the CM appears several times in the CM-transmission list.

D3: CM Advantages/disadvantages

The CM advantages/disadvantages are conditions applied when the user receives a CM group during the prescribed period. The conditions are as follows.

When a CM set is selected, the incentive points of the CM sponsors are added, and +300 points are added to the account of the terminal (user) controlled by a charge-settling system. The cash-back of the CM advantages and disadvantages is −200 yen.

In the data-providing system 100, each CM set is paired with a group of program codes, each designating one program to be inserted in the CM, in order to insert the CM set into various programs.

The CM set, <CM 34, CM 56, CM 22>, may be used for program 23, program 134 and program 344. If so, the program code group is <23, 134, 344>.

CM sets of the same program code group are not always described in the same CM-transmission list. This is because CM sets may be transmitted in an order different from the order they are arranged in the program code group.

The advantages and disadvantages determined in the data-providing system 100 are those the user may have when he receive a program or a combination of program and CMs. They are determined from the program prices for users and the CM advantages and disadvantages.

Figure 24:
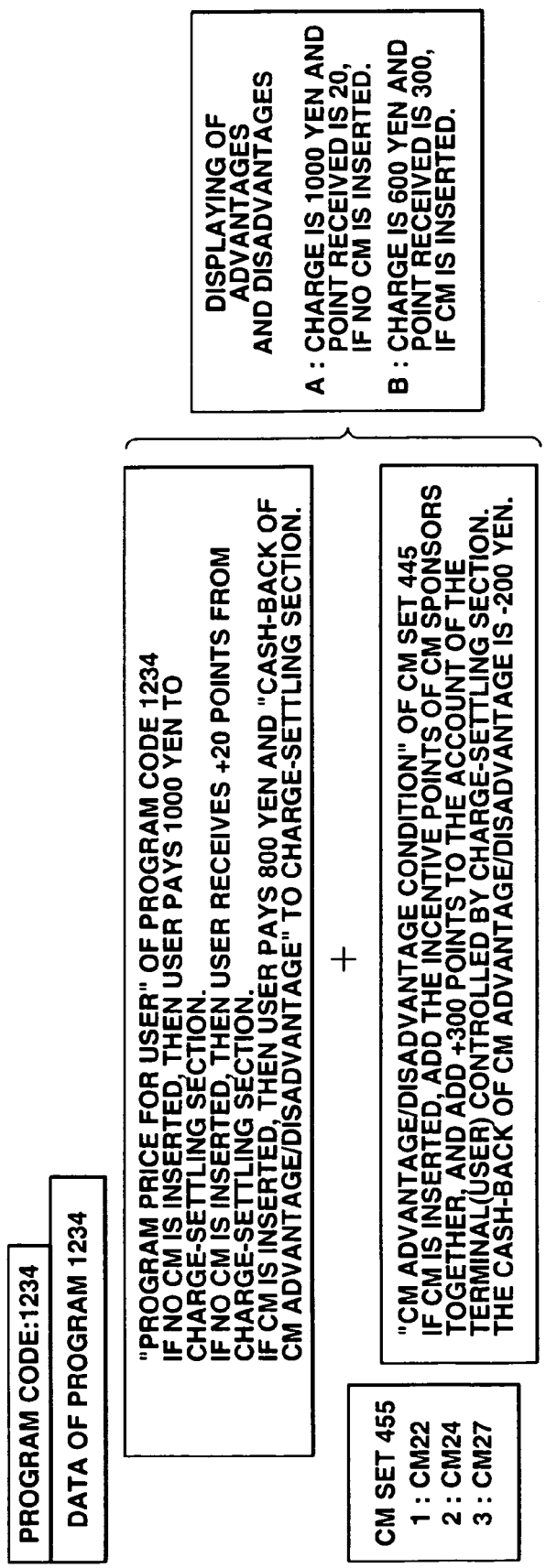
FIG. 24 is a diagram explaining how to determine the advantages and disadvantages the user may have when he uses the data-providing system.

Assume that a CM set 445 is inserted in the program 1234 as shown in FIG. 24. The program 1234 has the prices for users (A1), and the CM set 445 has the CM advantages/disadvantages (D3). The advantages and disadvantages the user has when he receives the combination of the program 1234 and the CM set 445 are calculated as follows:

(1) If no CMs are received (if no CMs are inserted in the program), the user pays 1000 yen and receives 20 points.

(2) If CMs are received (if any CM set is inserted in the program), the user pay 600 yen (800-200), and receives 300 points.

Figure 25:
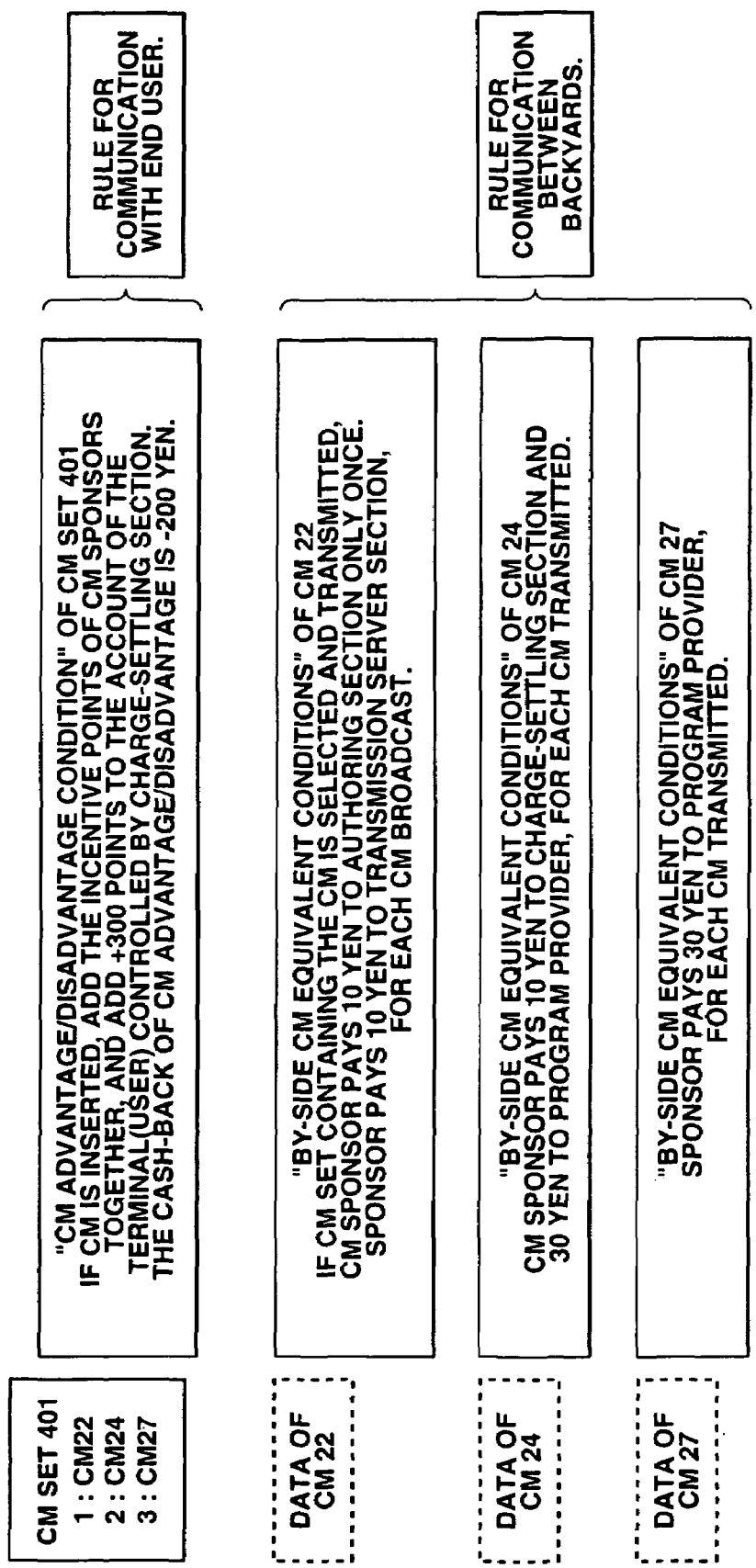
FIG. 25 is a diagram illustrating the relation between the advantages and disadvantages of each CM set and the BY-side CM equivalent condition of the CM set, observed in the data-providing system.

FIG. 25 illustrates the relation the CM advantage/disadvantage of each CM set has with the BY-side CM equivalent conditions of the CM set in the data-providing system 100.

The costs of a supplier are calculated in the data-providing system 100, as will be described below.

In the system 100, the transmission server section 40 determines:

(i) Which program has been transmitted;

(ii) Which CM has been transmitted and how many times;

(iii) In what condition the program has been transmitted; and (iv) In what condition the CM has been transmitted.

On the basis of the facts there are determined (1) the BY-side program equivalent conditions of the program and (2) the BY-side CM equivalent conditions of the CM. From these conditions it is determined how equivalents should be paid.

For example, the charge is settled as follows when a program having the BY-side program equivalent conditions (A2) is transmitted, together with a CM having the BY-side CM equivalent conditions (B1).

The charge-settling section 50 pays 100 yen to the program-providing section 10.

The charge-settling section 50 pays 10 yen to the program-providing section 10.

The charge-settling section 50 pays 10 yen to the transmission server section 40.

The CM sponsor section 20 pays 10 yen to the authoring section 30.

The CM sponsor section 20 pays 20 yen to the charge-settling section 50.

(What the user needs to pay has not been specified here.)

If a program having the BY-side program equivalent conditions (A2) is transmitted alone, the charge-settling is carried out as will be described below:

The charge-settling section 50 pays 100 yen to the program-providing section 10.

(What the user needs to pay has not been specified here.).

Figure 26:
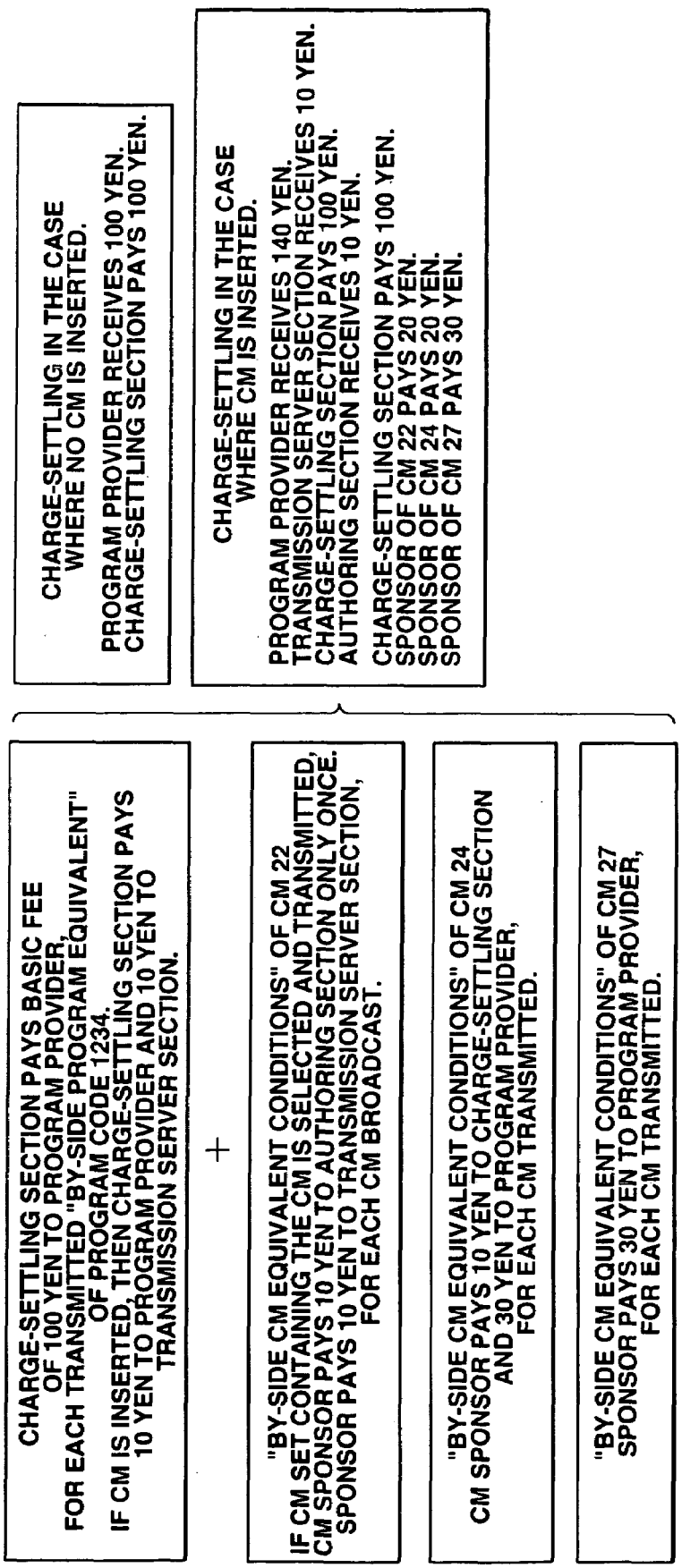
FIG. 26 is a diagram showing a method of calculating the data supplier's cost from the BY-side program equivalent conditions and the BY-side CM equivalent conditions, in the data-providing system.

FIG. 26 explains how the data supplier's costs are calculated from the BY-side program equivalent conditions of the program 1234 and the BY-side CM equivalent conditions of the CM 22, CM 24 and CM 27.

In the data-providing system 100, a CM menu is used to select a CM or CMs to be inserted into a program after the user has selected the program from the program menu. The user can select any CM from the many shown in the CM menu. The CM menu is displayed, in most cases along with the advantages and disadvantages the user may have when he selects a CM or CMs.

In the data-processing system 100, a control process is effected when a program is selected and a program-transmitting mode is selected from the four alternative modes. The four program-transmitting modes are: (1) transmitting the program along with CM set 401; (2) transmitting the program together with CM set 501; and (3) to transmitting the program along with no CMs.

In the program-transmitting mode (1), the CM set 401 is inserted in the program. Therefore, the control process is carried as follows. First, the pointer in the CM-transmission list for the CM set 401 is advanced every time a cue is detected in the program, thereby detecting the number of each CM. Then, the presence of a CM is detected from the data of the CM set 401, which is paired with the program. The name of any CM transmitted is described in a transmission record (for future inspection). These steps of the control process are repeated until the program terminates.

Figure 27:
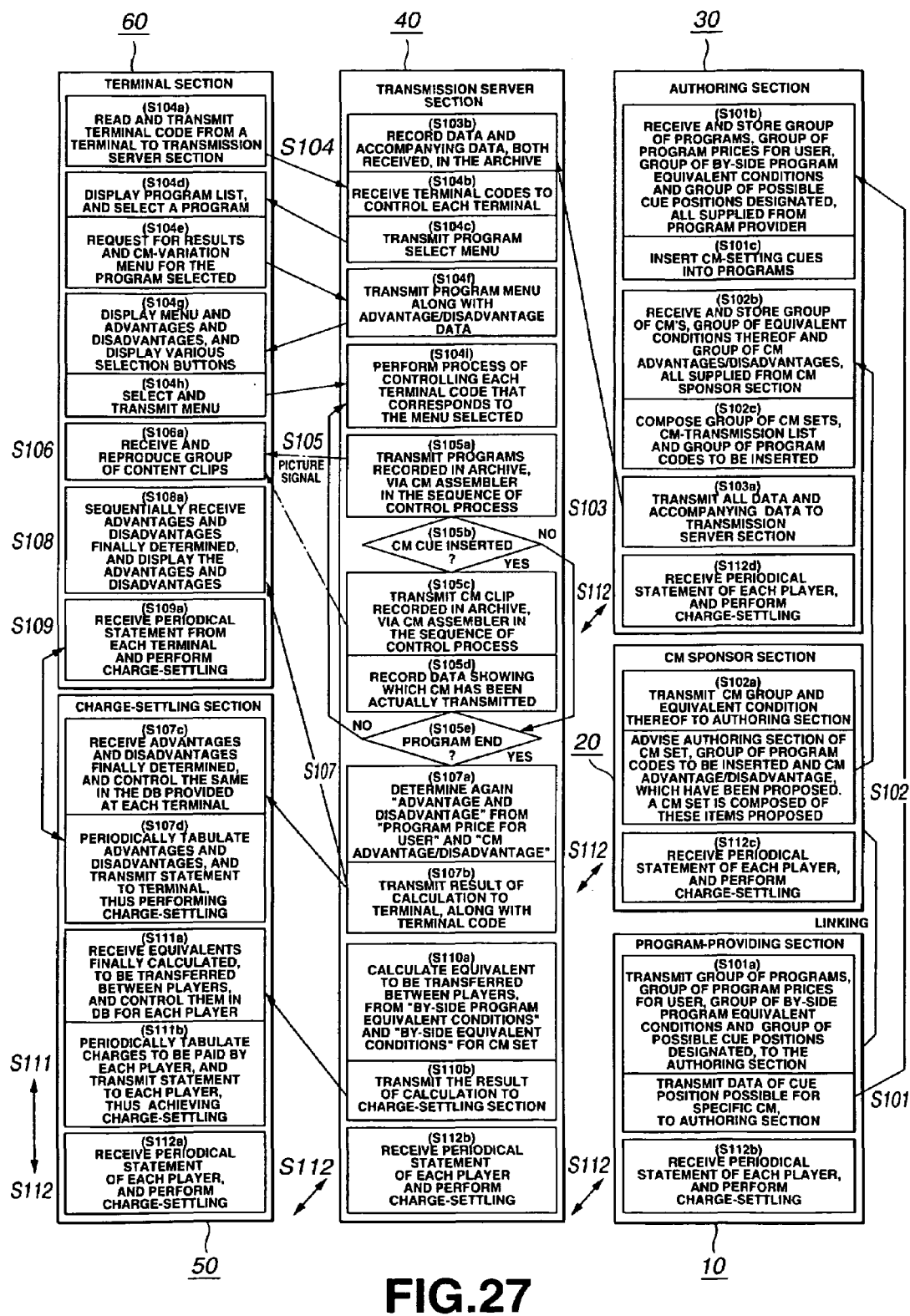
FIG. 27 is a flow chart explaining the operation sequence performed in the data-providing system.

Steps S101 to S112 are performed in the data-providing system 100, as will be explained with reference to the flow chart of FIG. 27.

In the first Step S101, the data-depositing function 10B of the program-providing section 10 transmits programs and accompanying data to the authoring section 30 (Step S101a). The accompanying data includes the program prices for user, the BY-side program equivalent conditions, the possible cue positions designated, and the like. In the authoring section 30, the first registering/storing/transmitting function 30D receives and stores the programs, program prices for user, BY-side program equivalent conditions and possible cue positions designated, all transmitted from the program-providing section 10 (Step S101b). The cue-mark inserting function 30B inserts cue marks into the programs (S101c), each mark being a signal indicating where in a program a CM can be inserted.

In the next Step S102, the data-transmitting function 20B of the CM sponsor section 20 transmits a CM group and the equivalent conditions of the CMs to the authoring section 30 (Step S102a). Further, the data-transmitting function 20B advises the authoring section 30 of the program codes to be inserted and the CM advantages/disadvantages, which have been proposed. In the authoring section 30, the second registering/storing/transmitting function 30E receives and stores the CM group, CM equivalent conditions, program codes to be inserted and CM advantages/disadvantages, all supplied from the CM sponsor section 20 (Step S102b). In the authoring section 30, the CM-group designating function 30C composes a group of CM sets, a CM-transmission list, list of CM sets, and a group of program codes to be inserted (Step S102c).

In Step S103, the registering/storing/transmitting functions 30D, 30E and 30F transmit all data and accompanying data to the transmission server section 40 (Step S103a). In the transmission server section 40, the archive function 40B records the data and the accompanying data (Step S103b).

In Step S104, the terminal-code storing/transmitting function 60B of the terminal section 60 reads a terminal code form a terminal and transmits the same to the transmission server section 40 (Step S104a). In the transmission server section 40, the process-managing function 40C receives the terminal code from the terminal section 60 in order to control each terminal (Step S104b). The menu-transmitting function 40E of the transmission server section 40 transmits a program menu to the terminal section 60 (Step S104c). In the terminal section 60, the program displaying/selecting/transmitting function 60C receives and displays the program menu transmitted from the transmission server section 40 and selects a program (Step S104d). Further, the CM-menu displaying function 60D of the terminal section 60 requests for results and a CM-variation menu for the program selected (S104e). The transmission server section 40 transmits the program menu, along with the advantage/disadvantage data, to the terminal section 60 (S104f). In the terminal section 60, the advantage/disadvantage displaying function 60E displays the advantage/disadvantage data transmitted from the transmission server section 40 and various sections buttons (Step S104g). The CM-menu selecting/transmitting function 60F of the terminal section 60 selects a CM menu and transmits the same to the transmission server section 40 (Step S104h). The transmission server section 40 performs a process of controlling each terminal code that corresponds to the CM menu selected (Step S104i).

In the next Step S105, the archive function 40B of the transmission server section 40 transmits the programs recorded in the archive, one after another, to the terminal section 60 in the control process (Step S105a). Then, it is determined whether a CM cue has been inserted or not (Step S105b). If a CM cue has been inserted, the archive function 40B transmits a CM clip recorded, to the terminal section 60 in the control process (Step S105c). The transmission-record storing function 40J records the data showing which CM has been actually transmitted (Step S105d). It is then determined whether the program has terminated or not (Step S105e). If the program has not terminated yet, the archive function 40B transmits the remaining programs recorded, to the terminal function 60 in the control process.

In Step S106, the reproducing function 60G of the terminal function 60 receives and reproduces the data of each program and the auxiliary data items (Step S106a).

In Step S107, the advantage/disadvantage determining function 40D of the transmission server section 40 determines advantages and disadvantages from the program prices for user and the CM advantage/disadvantage (Step S107a). The result transmitting function 40H transmits the CM advantage/disadvantage finally determined and the terminal code, to the charge-settling section 50 and terminal function 60 (Step S107b). Thus, in the charge-settling section 50, the terminal settlement function 50B and settlement-data management DB function 50D receive the advantages and disadvantages finally determined for the terminal code, and control the same in the settlement-data management DB of the terminal (Step S107c). The terminal-settlement function 50F of the charge-settling section 50 periodically tabulates the advantages and disadvantages for each terminal and transmits a statement to the terminal, thereby settling charges (Step S107d).

In Step S108, the advantage/disadvantage displaying function 60E of the terminal section 60 receives and displays the advantages and disadvantages finally determined and sequentially transmitted from the transmission server section 40 (Step S108a).

In the next Step S109, the charge-settling function 601 of the terminal section 60 receives the periodical statement from the charge-settling section 50 and performs charge-settling (Step S109a).

In Step S110, the charge-calculating function 401 of the transmission server section 40 calculates the equivalents to be transferred between the players, from the BY-side program equivalent conditions and the BY-side equivalent conditions for each CM included in the CM set (Step S110a). The function 401 then transmits the equivalents calculated to the charge-settling section 50 (Step S110b).

In Step S111, the player-charge calculating function 50C of the charge-settling section 50 receives the equivalents supplied from the transmission server section 40, which are to be transferred between the players, controls the equivalents in the DB of each player (Step S111a). Further, the settlement-data management DB function 50E of the charge-settling section 50 periodically tabulates the charges each player must pay and transmits a statement to each player, thus accomplishing charge-settling (Step S111b).

Further, in Step S112, the charges are settled in the charge-settling section 50 in accordance with the periodical statements of the players (Step S112a). The charge-settling function 10D of the program-providing section 10 settles charges in accordance with the statements for the players, transmitted from the charge-settling section 50 (Step S112b). The charge-settling function 20C of the CM sponsor section 20 settles charges in accordance with the statements for the players, transmitted from the charge-settling section 50 (Step S112c). Next, the charge-settling function 30G of the authoring section 30 settles charges in accordance with the statements for the players, transmitted from the charge-settling section 50 (Step S112*d*). Then, the charge-settling function 40K of the transmission server section 40 settles charges in accordance with the statement for the players, transmitted from the charge-settling section 50 (Step S112*e*).

The data-providing system 100 enables the user to select any one of CM sets available, thereby obtaining a combination of a part of packaged program data and some of auxiliary data items, by virtue of the characteristics of on-demand broadcasting.

For example, timer-calendar data may be applied to the profile of the user apparatus, thereby to replace CMs that no longer need to broadcast, with new ones. The data about the area where the user lives may be applied to the profile, in order to replace the national-version CMs with local-version CMs. Moreover, the data of the user's income may be applied to the profile, thereby broadcast more or less CMs for expensive goods. Further, the timer-calendar data may be applied to the profile, to broadcast programs about cherry-blossom viewing tours at any place where the cherry-blossom front has reached. Alternatively, the areas to which the user plans to take a trip may be applied to the profile, thereby to replace CMs with the CMs for sightseeing in those areas. Further, the annual income of the user may be applied to the profile of the user apparatus. In this case, the guide program for teaching how to prepare annual income report may be revised if the user gets a profit by selling real estate or receives a retirement bonus. Still further, the business title of the user may be applied to the profile, to transmit a program to the user apparatus, which has been so edited in part that the user may understand it better than otherwise. The information (auxiliary data item) about the stock or bond the user has bought may be applied to the profile of the user apparatus. If so, the user can receive a stock-market report centering on the very stock he or she has bought. The information (auxiliary data item) about the user's favorite baseball team may be applied to the profile, so that the user may enjoy a sport program centering on that baseball team. The children's birthdays may be applied to the profile of the user apparatus, so that an educational program edited may be revised for the children and then broadcast. Further, the user's tastes for music may be applied to the profile, thereby to transmit a BGM program full of the user's favorite music to the user apparatus. Moreover, the operating schedule of the airline the user often uses may be automatically analyzed and the results of analysis may be applied to the profile of the user apparatus. In this case, the user can enjoy a program in which the flight timetable of that airline is scroll-displayed.

With the data-providing system 100 it is possible to automatically update and analyze the profile of the user, whereby programs can be revised for the user.

What is claimed is:

1. A data-providing system comprising:
   a data transmitter device configured to transmit a continuous stream of content data including multimedia content groups, each including program data and auxiliary data items;
   an edit control section configured to perform an editing operation on attributes of each program data and auxiliary data items, thereby automatically assembling new content data, the attributes including a conflict attribute identifying associated content data which is precluded from assembly with predetermined other content data for providing new content data, and
   a data-transmitting section configured to select the auxiliary data items to be inserted into the program data in accordance with the new content data assembled by the edit control section, thereby to transmit a continuous stream of adapted content data that includes multimedia content groups, each including the program data and the auxiliary data items,
   wherein the auxiliary data items include, at least, a validity term and conditions relative to the assignment of rights for editing attributes of each auxiliary data item.

2. The system according to claim 1, further comprising:
   a data server apparatus configured to change the order of the items of the new content data which has been assembled by the edit control section and which includes multimedia content groups, each including the program data and the auxiliary data items, and configured to output the items of new content data in the order changed, thereby to transmit the new content data.

3. The system according to claim 1, further comprising:
   a data server apparatus configured to skip certain auxiliary data items contained in the new content data which has been assembled by the edit control section and which includes multimedia content groups, each including the program data and the auxiliary data items, thereby to transmit the new content data.

4. The system according to claim 1, further comprising:
   a data server apparatus configured to transmit additional auxiliary data items, together with the new content data which has been assembled by the edit control section and which includes multimedia content groups, each including the program data and the auxiliary data items.

5. The system according to claim 4, wherein the data server apparatus acquires the additional auxiliary data items from an external system, by the use of the edit control section.

6. The system according to claim 4, wherein the data server apparatus incorporates a generator to generate additional auxiliary data items.

7. The system according to claim 1, further comprising:
   a data terminal apparatus configured to change the order of the items of the new content data which has been assembled by the edit control section and which includes multimedia content groups, each including the program data and the auxiliary data items, and configured to transmit the items of new content data in the order changed.

8. The data-providing system of claim 1, wherein the conflict attribute identifies a list of conflicting content provider entities.

* * * * *